(12) United States Patent
Otsuki et al.

(10) Patent No.: US 10,912,164 B2
(45) Date of Patent: Feb. 2, 2021

(54) HEATING DEVICE FOR EXHAUST CATALYST

(71) Applicant: TOYOTA JIDOSHA KABUSHIKI KAISHA, Aichi-ken (JP)

(72) Inventors: Hiroshi Otsuki, Gotenba (JP); Norio Inami, Susono (JP); Shinji Ikeda, Mishima (JP); Hikaru Ikeda, Yokohama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/498,562

(22) PCT Filed: Mar. 22, 2018

(86) PCT No.: PCT/IB2018/000345
§ 371 (c)(1),
(2) Date: Sep. 27, 2019

(87) PCT Pub. No.: WO2018/178763
PCT Pub. Date: Oct. 4, 2018

(65) Prior Publication Data
US 2020/0053843 A1 Feb. 13, 2020

(30) Foreign Application Priority Data
Mar. 28, 2017 (JP) ................. 2017-063085

(51) Int. Cl.
*H05B 6/68* (2006.01)
*F01N 3/20* (2006.01)
(Continued)

(52) U.S. Cl.
CPC .......... *H05B 6/681* (2013.01); *F01N 3/2026* (2013.01); *F01N 3/2828* (2013.01); *H05B 6/645* (2013.01);
(Continued)

(58) Field of Classification Search
CPC combination set(s) only.
See application file for complete search history.

(56) References Cited

U.S. PATENT DOCUMENTS 7,354,558 B2 * 4/2008 Tsuji .................... B01D 53/323
422/177
7,931,727 B2 * 4/2011 Gonze .................. F01N 13/009
55/523
(Continued)

FOREIGN PATENT DOCUMENTS

EP 2326142 A1 5/2011
JP H6-10654 A 1/1994

OTHER PUBLICATIONS

Min Kyu Park et al., "Dielectric properties of alumina ceramics in the microwave frequency at high temperature", Solid State Phenomena vols. 124-126 (2007), pp. 743-746, Online available since Jun. 15, 2007 at www.scientific.net, Trans Tech Publications, Switzerland, 5pp.

*Primary Examiner* — Binh Q Tran
(74) *Attorney, Agent, or Firm* — Hauptman Ham, LLP

(57) ABSTRACT

A heating device for an exhaust catalyst includes a first antenna and a second antenna. The heating device executes a specific radiation control for controlling operation of an electromagnetic wave generator to set a radiation state of an electromagnetic wave from the first antenna to be a different state from a radiation state of an electromagnetic wave from the second antenna. In such a case, the heating device acquires an intensity of an electromagnetic wave, of electromagnetic waves incident on the first antenna, and acquires an intensity of an electromagnetic wave, of electromagnetic waves incident on the second antenna. The heating device acquires a first temperature-correlated value for the first part based on the first electromagnetic wave intensity, and acquires a second temperature-correlated
(Continued)

value for the second part based on the second electromagnetic wave intensity.

4 Claims, 13 Drawing Sheets

(51) Int. Cl.
    *F01N 3/28*     (2006.01)
    *H05B 6/64*     (2006.01)
    *H05B 6/42*     (2006.01)
    *H05B 6/80*     (2006.01)
    *H05B 6/72*     (2006.01)

(52) U.S. Cl.
    CPC ............... *H05B 6/72* (2013.01); *H05B 6/80* (2013.01); *F01N 2510/06* (2013.01)

(56) References Cited

U.S. PATENT DOCUMENTS

| | | | |
|---|---|---|---|
| 8,384,397 B2* | 2/2013 | Bromberg | F01N 13/009 |
| | | | 324/636 |
| 2010/0269567 A1* | 10/2010 | Kondo | G01N 22/02 |
| | | | 73/23.33 |
| 2014/0298775 A1* | 10/2014 | Snopko | F01N 3/023 |
| | | | 60/274 |
| 2017/0107887 A1* | 4/2017 | Beulertz | F01N 11/00 |
| 2017/0211453 A1* | 7/2017 | Sappok | H04B 17/18 |

* cited by examiner

IIA-IIA SECTION          IIB-IIB SECTION

HEATING DEVICE FOR EXHAUST CATALYST

INCORPORATION BY REFERENCE

This is a National Phase Entry of International Application No. PCT/IB2018/000345, filed Mar. 22, 2018, and claims priority of Japanese Patent Application No. 2017-063085 filed on Mar. 28, 2017, which is incorporated herein by reference in its entirety.

BACKGROUND OF THE INVENTION

1. Field of the Invention

The present invention relates to a heating device for an exhaust catalyst, the heating device generating heat by absorbing electromagnetic waves from an electromagnetic wave generator.

2. Description of Related Art

In the related art, a heating device for an exhaust catalyst is known to generate heat by absorbing an electromagnetic wave from an electromagnetic wave generator and heat the catalyst to a temperature at which the catalyst exhibits a removal capability. When the catalyst is heated by the electromagnetic wave generated by oscillation from the electromagnetic wave generator, such a device poses a problem in that the catalyst is easily overheated since a comparatively short time period is taken until the temperature of the catalyst reaches an activation temperature. Thus, the temperature of an electromagnetic wave absorptive heat generating body in the catalyst needs to be accurately detected, and the electromagnetic wave generator needs to be accurately controlled.

Therefore, one of exhaust gas control apparatuses for an internal combustion engine in the related art (hereinafter, referred to as "apparatus in the related art") includes a sensor that measures the amount of electromagnetic wave absorbed by the electromagnetic wave absorptive heat generating body, and controls the amount of electromagnetic wave generated by oscillation from the electromagnetic wave generator in accordance with the measured value of the sensor (for example, refer to Japanese Unexamined Patent Application Publication No. 6-10654 (JP 6-10654 A)).

SUMMARY OF THE INVENTION

According to the inventors, the ratio of the electric power of a part of an electromagnetic wave (incident wave) reflected by an exhaust catalyst and incident on an antenna of an electromagnetic wave generator to the electric power of the electromagnetic wave (radiated wave) radiated from the antenna of the electromagnetic wave generator is correlated with the temperature of the catalyst. For example, a ferroelectric body is used as the electromagnetic wave absorptive heat generating body. The electric power of an electromagnetic wave (absorbed electric power) absorbed by such an electromagnetic wave absorptive heat generating body is generally proportional to the dielectric loss factor tan δ of the electromagnetic wave absorptive heat generating body. The dielectric loss factor tan δ of the electromagnetic wave absorptive heat generating body is changed depending on the temperature. Thus, the electric power absorbed by the electromagnetic wave absorptive heat generating body is changed depending on the temperature. That is, one of factors that correlates the ratio of the electric power of the incident wave to the electric power of the radiated wave with the temperature of the catalyst is the electromagnetic wave absorbance of the electromagnetic wave absorptive heat generating body that is changed according to the temperature as a result of a change in the dielectric loss factor tan δ of the electromagnetic wave absorptive heat generating body depending on the temperature.

When the exhaust catalyst is heated by the electromagnetic wave, such a factor poses a problem of easily causing a temperature distribution in the catalyst. More specifically, the electric power of the electromagnetic wave absorbed by the electromagnetic wave absorptive heat generating body in the catalyst (absorbed electric power) is generally proportional to the square of the electric field strength and is easily affected by the distribution of the electric field strength. The electric field strength is increased as the distance from the antenna radiating the electromagnetic wave becomes shorter. Thus, the absorbed electric power of the catalyst is significantly affected by the shape and arrangement of the antenna. Typically, the absorbed electric power of the electromagnetic wave absorptive heat generating body tends to be increased along with an increase in temperature in a temperature range used for the catalyst. In other words, a part of the catalyst having a relatively high temperature is easily heated, and a part of the catalyst having a relatively low temperature is not easily heated. That is, variation in temperature distribution caused by heating becomes significant as the temperature of the catalyst (electromagnetic wave absorptive heat generating body) is increased. Thus, when significant variation in temperature distribution occurs in the catalyst, the catalyst may be damaged due to the difference in temperature. A problem may also arise in that the catalyst cannot exhibit a sufficient removal capability in a part that has a low electric field strength and does not have an increase in temperature.

In the case of a heating device that includes a plurality of electromagnetic wave generators and corresponding antennas for uniformly and efficiently heating the catalyst and is configured to heat the catalyst from a plurality of locations, the catalyst is affected by a plurality of electromagnetic waves, and a problem arises in that it is difficult to accurately estimate a temperature distribution in the catalyst.

The present invention provides a heating device for an exhaust catalyst. The heating device can accurately estimate a temperature distribution in a catalyst even when a plurality of electromagnetic wave generators is present. The heating device can suppress damaging of the catalyst and cause the catalyst to exhibit a sufficient removal capability across a wide range in the catalyst by reducing variation in temperature distribution based on the temperature distribution.

An aspect of the present invention relates to a heating device for an exhaust catalyst. The heating device is applied to the exhaust catalyst disposed in an exhaust passage of an internal combustion engine, the exhaust catalyst being configured to generate heat by absorbing an electromagnetic wave.

The heating device according to the aspect of the present invention includes at least one electromagnetic wave generator configured to generate an electromagnetic wave, a first antenna that is disposed close to a first part of the exhaust catalyst and is configured to radiate the electromagnetic wave generated by the electromagnetic wave generator to the first part, a second antenna that is disposed close to a second part of the exhaust catalyst different from the first part, is disposed at a predetermined interval from the first antenna, and is configured to radiate the electromagnetic wave generated by the electromagnetic wave generator to the second part, and an electronic control device.

The electronic control device is configured to execute a catalyst temperature increasing control for increasing a temperature of the exhaust catalyst by controlling the electromagnetic wave generator to radiate the electromagnetic wave to the first part and the second part from the first antenna and the second antenna respectively.

For example, the exhaust catalyst for the heating device according to the aspect of the present invention includes an electromagnetic wave absorptive heat generating body that is a ferroelectric body. When the electromagnetic wave is radiated to the exhaust catalyst, the exhaust catalyst generates heat by absorbing the electromagnetic wave. Generally, the electromagnetic wave radiated from the antenna has a higher electric field strength closer to the antenna. Accordingly, as the exhaust catalyst (electromagnetic wave absorptive heat generating body) is closer to the antenna, the amount of electromagnetic wave absorbed by the exhaust catalyst is increased, and the exhaust catalyst is more easily heated. As described above, there is an exhaust catalyst that has a characteristic such that the amount of absorbed electromagnetic wave is increased (the absorbance is increased) as the temperature of the catalyst is increased.

In the exhaust catalyst having such a characteristic, it is considered that the intensity of the electromagnetic wave radiated from the first antenna is equal to the intensity of the electromagnetic wave radiated from the second antenna, and that the temperature of the first part of the exhaust catalyst is higher than the temperature of the second part. In such a case, the electromagnetic wave absorbance in the first part is higher than the electromagnetic wave absorbance in the second part. Thus, in such a case, the intensity of the "reflective wave generated from the first part by the electromagnetic wave radiated from the first antenna" incident on the first antenna is lower than the intensity of the "reflective wave generated from the second part by the electromagnetic wave radiated from the second antenna" incident on the second antenna.

While the first antenna is close to the first part, and the second antenna is close to the second part, the first antenna and the second antenna are disposed at a predetermined interval. In other words, the distance between the first antenna and the second antenna is longer than the distance between the first antenna and the first part and the distance between the second antenna and the second part. Generally, the intensity of the electromagnetic wave radiated from the antenna is decreased in inverse proportion to the square of the distance. Thus, the intensity of the "electromagnetic wave radiated from the second antenna and the reflective wave thereof" incident on the first antenna is lower than the intensity of the "reflective wave generated from the first part by the electromagnetic wave radiated from the first antenna" incident on the first antenna.

However, when the temperature of the first part is relatively high, the intensity of the "reflective wave generated from the first part by the electromagnetic wave radiated from the first antenna" incident on the first antenna is comparatively low. Thus, the intensity of the "electromagnetic wave radiated from the second antenna and the reflective wave thereof" incident on the first antenna may not be ignored.

The electronic control device is configured to execute a specific radiation control for controlling operation of the electromagnetic wave generator to set a radiation state of the electromagnetic wave from the first antenna to be a different state from a radiation state of the electromagnetic wave from the second antenna. The electronic control device is configured to acquire an intensity of an electromagnetic wave, of electromagnetic waves incident on the first antenna at the execution of the specific radiation control, which corresponds to the radiation state of the electromagnetic wave radiated from the first antenna as a first electromagnetic wave intensity. The electronic control device is configured to acquire an intensity of an electromagnetic wave, of electromagnetic waves incident on the second antenna at the execution of the specific radiation control, which corresponds to the radiation state of the electromagnetic wave radiated from the second antenna as a second electromagnetic wave intensity.

As described above, for example, by executing the specific radiation control for configuring different radiation states for the electromagnetic wave, the "reflective wave generated from the first part by the electromagnetic wave radiated from the first antenna" incident on the first antenna may be distinguished from the "electromagnetic wave radiated from the second antenna and the reflective wave thereof" incident on the first antenna.

The electronic control device is configured to acquire, based on the first electromagnetic wave intensity, a first temperature-correlated value that is a value correlated with a temperature of the first part. The electronic control device is configured to acquire, based on the second electromagnetic wave intensity, a second temperature-correlated value that is a value correlated with a temperature of the second part.

When the first temperature-correlated value and the second temperature-correlated value are different from each other, the electronic control device is configured to control the operation of the electromagnetic wave generator to adjust at least one of the intensity and an output duty cycle of the electromagnetic wave radiated from at least one of the first antenna and the second antenna such that a deviation between the first temperature-correlated value and the second temperature-correlated value is decreased in the catalyst temperature increasing control.

More specifically, for example, the first temperature-correlated value (second temperature-correlated value) can be acquired based on the ratio of the first electromagnetic wave intensity (second electromagnetic wave intensity) incident on the first antenna (second antenna) to the intensity of the electromagnetic wave radiated from the first antenna (second antenna) (that is, the electromagnetic wave generated by the electromagnetic wave generator). The reason is because a relationship in which the electromagnetic wave absorbance is increased as the temperature of the catalyst is increased is established as described above.

The first temperature-correlated value (second temperature-correlated value) may be the "ratio of the intensity of the electromagnetic wave radiated from the first antenna (second antenna) and reflected by the exhaust catalyst to the intensity of the electromagnetic wave radiated from the first antenna (second antenna)". Alternatively, the first temperature-correlated value (second temperature-correlated value) may be the "ratio of the intensity of the electromagnetic wave radiated from the first antenna (second antenna) and absorbed by the exhaust catalyst to the intensity of the electromagnetic wave radiated from the first antenna (second antenna)". Alternatively, the first temperature-correlated value (second temperature-correlated value) may be a value that indicates the temperature.

Accordingly, by executing the specific radiation control, the heating device according to the aspect of the present invention can specify a plurality of electromagnetic waves radiated from a plurality of antennas, acquire the electromagnetic wave intensity for each electromagnetic wave, and estimate the temperature of a specific part (the first part and the second part) of the exhaust catalyst.

For example, when each temperature-correlated value is a correlated value that is increased along with an increase in temperature, and the first temperature-correlated value is lower than the second temperature-correlated value, the heating device according to the aspect of the present invention can accelerate the rate of increase in the temperature of the first part by increasing the intensity of the electromagnetic wave radiated from the first antenna. Consequently, the heating device according to the aspect of the present invention can increase the electromagnetic wave absorbance in the first part and accelerate the rate of increase in the temperature of the first part. Accordingly, the first temperature-correlated value can be approximated to the second temperature-correlated value.

The heating device according to the aspect of the present invention can decelerate the rate of increase in the temperature of the second part (or decrease the temperature of the second part) by decreasing the intensity of the electromagnetic wave radiated from the second antenna (or stopping radiation of the electromagnetic wave). Consequently, the heating device according to the aspect of the present invention can approximate the first temperature-correlated value to the second temperature-correlated value more quickly. Thus, according to the aspect of the present invention, deviation in the temperature distribution of the exhaust catalyst can be reduced.

In such a case, when the first temperature-correlated value is lower than the second temperature-correlated value, the heating device according to the aspect of the present invention can accelerate an increase in the temperature of the first part by increasing the output duty cycle of the electromagnetic wave radiated from the first antenna.

Accordingly, even with a plurality of antennas, the heating device according to the aspect of the present invention can accurately estimate the temperature of a specific part of the exhaust catalyst and the temperature distribution of the exhaust catalyst, and reduce variation in temperature distribution. Consequently, it is possible to suppress damaging of the catalyst and exhibit a sufficient removal capability across a wide range in the catalyst.

In the heating device according to the aspect of the present invention, the electronic control device may be configured to execute, as the specific radiation control, a first radiation control for controlling the operation of the electromagnetic wave generator to set the radiation state to be a state where the electromagnetic wave is radiated to the first part from the first antenna, and where the electromagnetic wave is not radiated to the second part from the second antenna, and a second radiation control for controlling the operation of the electromagnetic wave generator to set the radiation state to be a state where the electromagnetic wave is not radiated to the first part from the first antenna, and where the electromagnetic wave is radiated to the second part from the second antenna. The electronic control device may be configured to acquire, as the first electromagnetic wave intensity, the intensity of the electromagnetic waves incident on the first antenna at the execution of the first radiation control. The electronic control device may be configured to acquire, as the second electromagnetic wave intensity, the intensity of the electromagnetic waves incident on the second antenna at the execution of the second radiation control.

In the aspect of the present invention, the radiation state is set to be either a "state where the electromagnetic wave is radiated to the first part from the first antenna, and where the electromagnetic wave is not radiated to the second part from the second antenna" or a "state where the electromagnetic wave is not radiated to the first part from the first antenna, and where the electromagnetic wave is radiated to the second part from the second antenna". For example, the radiation state corresponds to a state where switching is performed in each divided time period per antenna between the state of generating the electromagnetic wave by oscillation and the state of stopping the electromagnetic wave. In other words, switching is performed between a state where the intensity of the electromagnetic wave from the first antenna is set to a predetermined intensity, and where the intensity of the electromagnetic wave from the second antenna is set to zero, and a state where the intensity of the electromagnetic wave from the first antenna is set to zero, and where the intensity of the electromagnetic wave from the second antenna is set to a predetermined intensity.

Accordingly, the heating device according to the aspect of the present invention separates (distinguishes) the electromagnetic wave of the first antenna from the electromagnetic wave of the second antenna by choosing whether or not to set the state of generating the electromagnetic wave by oscillation or the state of stopping the electromagnetic wave. In other words, the heating device separates the radiation antenna (specifies the antenna of the radiation source) by setting the period of radiating the electromagnetic wave from the first antenna to be different from the period of radiating the electromagnetic wave from the second antenna. According to the aspect of the present invention, it is possible to estimate the temperature distribution of the exhaust catalyst using a simple method of switching between generating the electromagnetic wave by oscillation and stopping the electromagnetic wave in order per radiation antenna, and causing the reflective wave to be incident on the incidence antenna.

In the heating device according to the aspect of the present invention, as the specific radiation control, the electronic control device may be configured to control the operation of the electromagnetic wave generator to radiate an electromagnetic wave having a first frequency from the first antenna and radiate an electromagnetic wave having a second frequency different from the first frequency from the second antenna. The electronic control device may be configured to acquire, as the first electromagnetic wave intensity, the intensity of the electromagnetic wave having the first frequency among the electromagnetic waves incident on the first antenna at the execution of the specific radiation control, and acquire, as the second electromagnetic wave intensity, the intensity of the electromagnetic wave having the second frequency among the electromagnetic waves incident on the second antenna at the execution of the specific radiation control.

In the aspect of the present invention, the radiation state is set to a "state where the electromagnetic wave from the first antenna has the first frequency, and where the electromagnetic wave from the second antenna has the second frequency different from the first frequency". That is, the heating device according to the aspect of the present invention separates the first antenna from the second antenna (specifies the antenna of the radiation source) by setting the oscillation frequency of the electromagnetic wave radiated from the first antenna to be different from the oscillation frequency of the electromagnetic wave radiated from the second antenna. According to the aspect of the present invention, switching does not need to be performed in order between the state of generating the electromagnetic wave by oscillation and the state of stopping the electromagnetic wave. Thus, it is possible to estimate the temperature distribution of the exhaust catalyst in a shorter time period.

In the heating device according to the aspect of the present invention, when the first temperature-correlated value is not a value that falls within a predetermined range, the electronic control device may be configured to control the operation of the electromagnetic wave generator to adjust at least one of the intensity and an output duty cycle of the electromagnetic wave radiated from the first antenna such that the first temperature-correlated value becomes a value that falls within the predetermined range. When the second temperature-correlated value is not a value that falls within the predetermined range, the electronic control device may be configured to control the operation of the electromagnetic wave generator to adjust at least one of the intensity and an output duty cycle of the electromagnetic wave radiated from the second antenna such that the second temperature-correlated value becomes a value that falls within the predetermined range.

According to the aspect of the present invention, for example, when each temperature-correlated value is a correlated value that is increased along with an increase in temperature, and the first temperature-correlated value (second temperature-correlated value) is higher than the predetermined range, decreasing the intensity of the electromagnetic wave radiated from the first antenna (second antenna) (or stopping radiation of the electromagnetic wave) can decelerate an increase in the temperature of the first part (second part) and furthermore, decrease the temperature of the first part (second part). When the first temperature-correlated value (second temperature-correlated value) is lower than the predetermined range, increasing the intensity of the electromagnetic wave radiated from the first antenna (second antenna) can accelerate an increase in the temperature of the first part (second part). Consequently, the heating device according to the aspect of the present invention can approximate the first temperature-correlated value (second temperature-correlated value) to a value within the predetermined range.

In such a case, when the acquired first temperature-correlated value (second temperature-correlated value) is lower than the predetermined range, the heating device according to the aspect of the present invention can also accelerate an increase in the temperature of the first part (second part) by increasing the output duty cycle of the electromagnetic wave radiated from the first antenna (second antenna).

When the acquired first temperature-correlated value (second temperature-correlated value) is higher than the predetermined range, the heating device according to the aspect of the present invention can also decelerate an increase in the temperature of the first part (second part) by decreasing the output duty cycle of the electromagnetic wave radiated from the first antenna (second antenna). Accordingly, according to the aspect of the present invention, it is possible to suppress damaging of the exhaust catalyst (particularly, damaging caused by melting due to an excessive increase in temperature) and exhibit a sufficient removal capability across a wide range in the catalyst.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinafter, a heating device for an exhaust catalyst according to a first embodiment of the present invention (hereinafter, referred to as "first heating device") will be described with reference to the drawings.

Configuration

Figure 1:
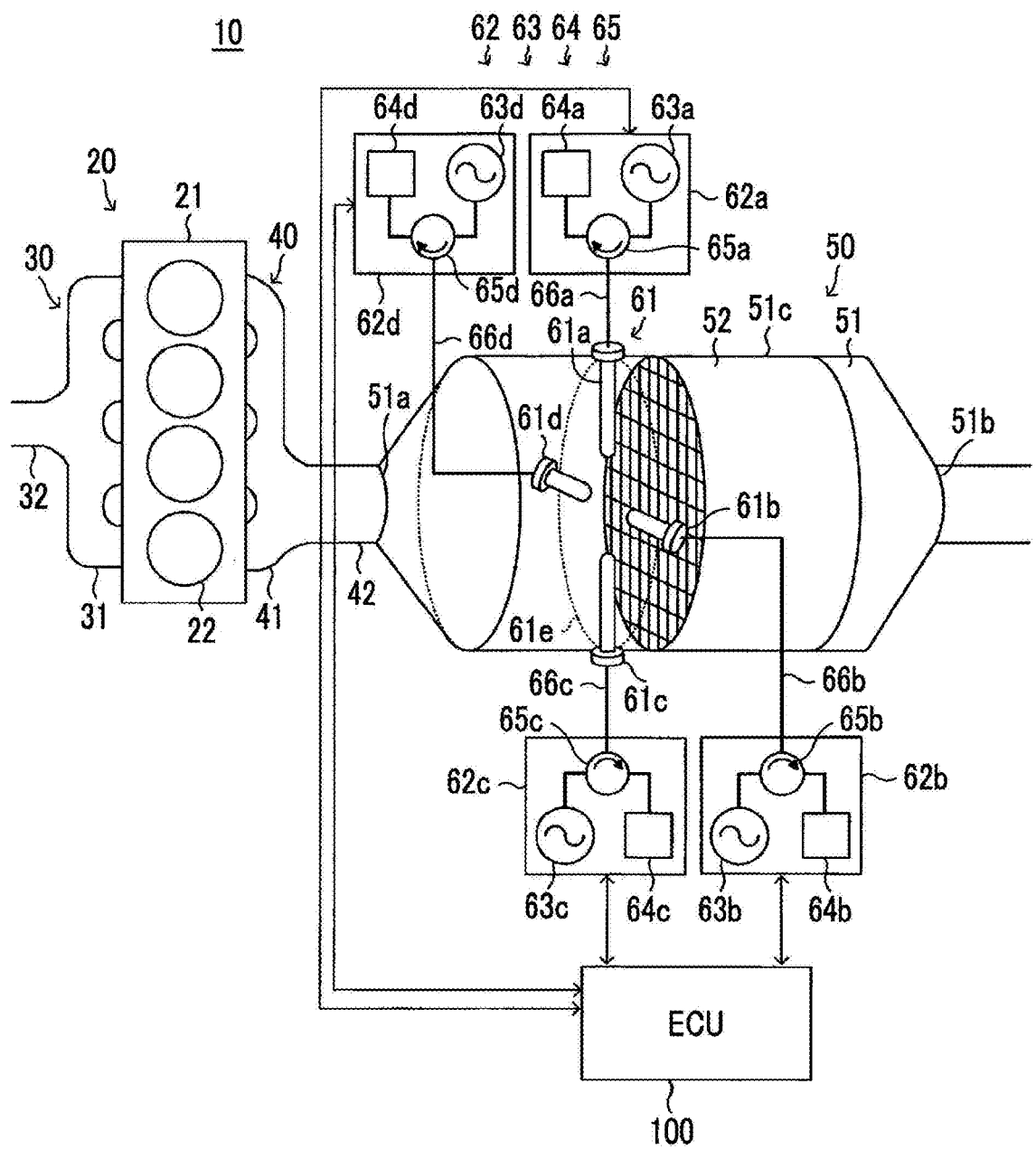
FIG. 1 is a schematic configuration diagram of a heating device for an exhaust catalyst according to an embodiment of the present invention, and an internal combustion engine to which the heating device is applied.

The first heating device is applied to an exhaust gas control apparatus 50 (exhaust catalyst 52) of an internal combustion engine (engine) 10 illustrated in FIG. 1.

The engine 10 is a four-cycle spark-ignition multi-cylinder (four cylinders in the present example) internal combustion engine. The engine 10 includes an engine main body portion 20, an intake system 30, and an exhaust system 40. The engine 10 includes a well-known engine actuator that is not illustrated. For example, the engine actuator includes a fuel supply device including a fuel injection valve, an ignition device including an ignition plug, a throttle valve opening degree changing actuator, and a variable intake valve control device (VVT). The engine 10 is configured to change the amount of intake air by the throttle valve actuator changing the opening degree of a throttle valve disposed in an intake passage not illustrated, and change the amount of fuel injection according to the amount of intake air, thereby being capable of changing torque generated by the engine 10 and the engine rotational speed (that is, engine output).

The engine main body portion 20 includes a main body 21 that includes a cylinder block, a cylinder head, a crankcase, and the like. Four cylinders (combustion chambers) 22 are formed in the main body 21. The intake system 30 includes an intake manifold 31 and an intake pipe 32. The exhaust system 40 includes an exhaust manifold 41, an exhaust pipe 42, and the exhaust gas control apparatus 50.

The exhaust manifold 41 includes a branch portion connected to each cylinder 22, and a merging portion where the branch portions merge with each other. The exhaust pipe 42 is connected to the merging portion of the exhaust manifold 41. The exhaust manifold 41 and the exhaust pipe 42 constitute an exhaust passage. The exhaust gas control apparatus 50 is disposed in the exhaust pipe 42.

The exhaust gas control apparatus 50 includes a housing 51, the exhaust catalyst 52, and the heating device.

The housing (hereinafter, referred to as "heating chamber") 51 is approximately cylindrical and has a shape in which the diameter of the housing 51 is decreased in the exhaust manifold 41, an exhaust entrance portion 51a connected through the exhaust pipe 42, and an exhaust exit portion 51b on the opposite side from the exhaust entrance portion 51a. For example, the inner diameter of the housing 51 is approximately 200 mm. For example, the inner diameter of the housing 51 in the exhaust entrance portion 51a and the exhaust exit portion 51b is approximately 30 mm. The inner diameter is for illustrative purposes and not restrictive for the present invention.

Figure 2:
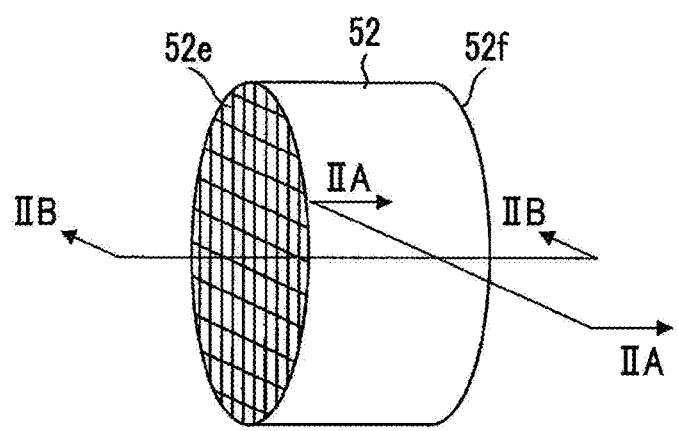
FIG. 2 is a sectional view of the exhaust catalyst illustrated in FIG. 1.
Figure 2:
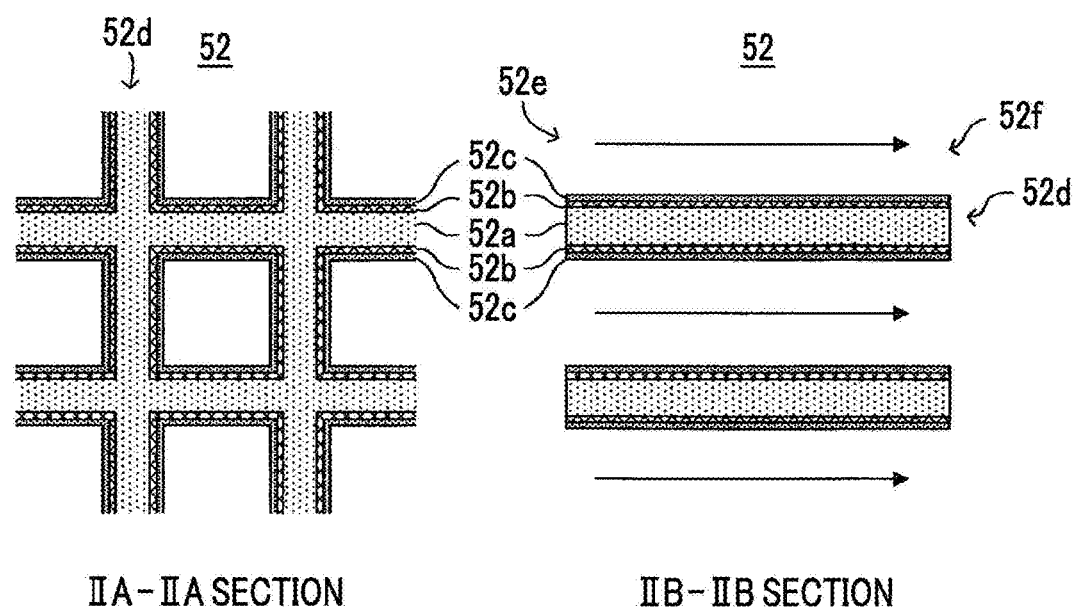

As illustrated in FIG. 2, a base material 52a of the exhaust catalyst (hereinafter, simply referred to as "catalyst") 52 is a monolith base material that is acquired by forming cordierite, which is heat resistant ceramic, in a cylindrical shape having a honeycomb structure. Thus, the exhaust catalyst 52 is referred to as "monolith catalyst". As illustrated in IIA-IIA section and IIB-IIB section, the monolith catalyst 52 has a stack structure in which an electromagnetic wave absorbing layer 52b and a catalyst coat layer 52c are applied to the base material 52a. A partition 52d that is formed in a honeycomb shape in the base material 52a extends parallel to the axial direction of the cylinder. A plurality of pores is open in the partition 52d. Each passage that is surrounded by the partition 52d at both ends of the partition 52d (an exhaust upstream side end surface 52e of the monolith catalyst 52 and an exhaust downstream side end surface 52f of the monolith catalyst 52) is open. The monolith catalyst 52 has a diameter of approximately 200 mm. The outer circumferential surface of the monolith catalyst 52 abuts the inner circumferential surface of the housing 51. The depth of the monolith catalyst 52 is approximately 100 mm to 200 mm. The inner diameter is for illustrative purposes and not restrictive for the present invention. The base material 52a is not limited to cordierite and may employ a base material made of ceramic such as silicon carbide, silica, alumina, and mullite, and a base material made of metal such as stainless steel including chrome and aluminum.

For example, a perovskite-based ceramic material which is a ferroelectric material is used as the electromagnetic wave absorbing layer 52h. More preferably, a material such as $La_2NiMnO_6$ (LNMO), $La_2CoMnO_6$ (LCMO), and silicon carbide SiC is used as the electromagnetic wave absorbing layer 52h. Such a material is stacked (applied) on the surface of the base material 52a. The ferroelectric material included in the electromagnetic wave absorbing layer 52b (hereinafter, referred to as "electromagnetic wave absorptive heat generating body") generates thermal energy by absorbing an electromagnetic wave.

Electric power (hereinafter, referred to as "absorbed electric power") $P_{ab}$ of the electromagnetic wave absorbed by the electromagnetic wave absorptive heat generating body is acquired by the following general formula.

$$Pab = K \bullet \varepsilon r \bullet \tan \delta \bullet f \bullet E^2 [W/m^3] \quad (1)$$

In the above general formula, K is a coefficient ($5.56 \times 10^{-11}$). The dielectric constant of a dielectric body is denoted by $\varepsilon r$. The dielectric loss factor of the dielectric body is denoted by $\tan \delta$. The frequency [Hz] of the electromagnetic wave is denoted by f. The electric field strength [V/m] is denoted by E.

Figure 3A:
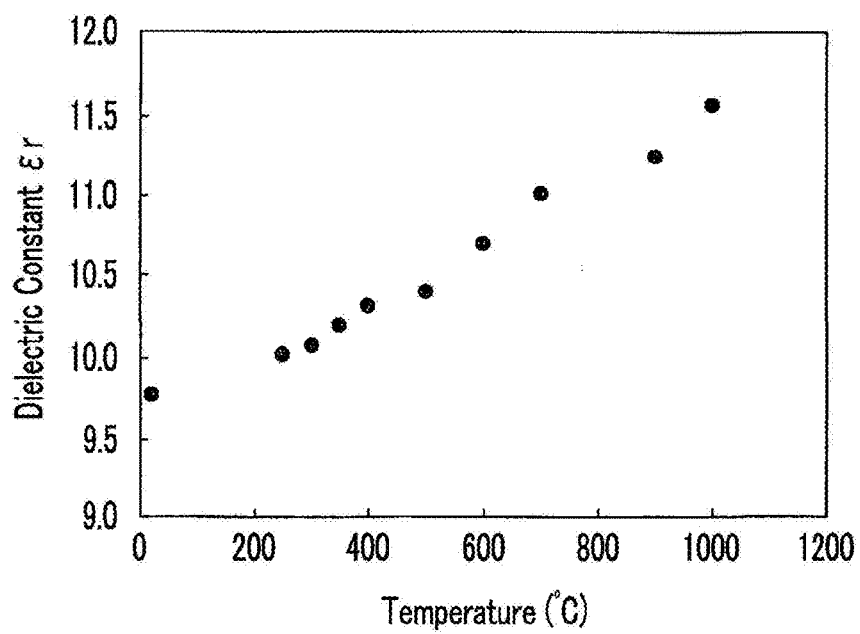
FIG. 3A is a graph illustrating the temperature dependence of a dielectric constant of a representative dielectric body in the microwave band.
Figure 3B:
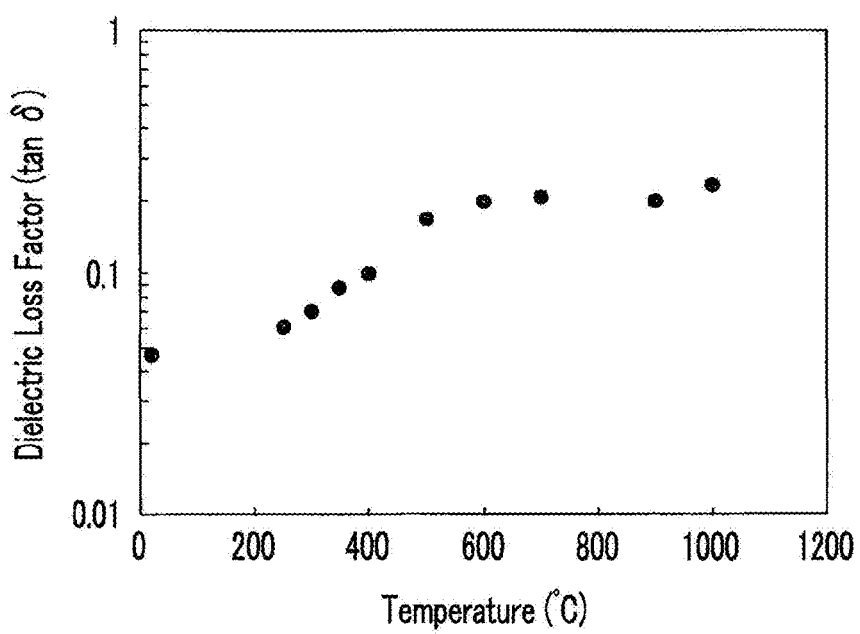
FIG. 3B is a graph illustrating the temperature dependence of a dielectric loss factor of a representative dielectric body in the microwave band.

As is understood from General Formula (1), the absorbed electric power Pab of the electromagnetic wave absorptive heat generating body is proportional to the square of the electric field strength E and is easily affected by the distribution of the electric field strength. As is understood from General Formula (1). The absorbed electric power Pab is proportional to the dielectric constant $\varepsilon r$ and the dielectric loss factor $\tan \delta$. For example, the dielectric constant $\varepsilon r$ and the dielectric loss factor $\tan \delta$ of alumina ($Al_2O_3$), which is one kind of paraelectric bodies, in the microwave band are known to be increased along with an increase in temperature as illustrated in FIG. 3A and FIG. 3B (refer to Min Kyu Park, et. al., "Dielectric Properties of Alumina Ceramics in the Microwave Frequency at High Temperature", Solid State Phenomena Vols. 124-126 (2007) pp. 743-746 (https://www.scientific.net/SSP.124-126.743)). Generally, properties of a dielectric body such as the dielectric constant $\varepsilon r$ and the dielectric loss factor $\tan \delta$ are common in the paraelectric body and the electromagnetic wave absorptive heat generating body which is a ferroelectric body. Accordingly, the temperature dependence of the dielectric constant $\varepsilon r$ and the dielectric loss factor $\tan \delta$ of the electromagnetic wave absorptive heat generating body exhibits the same, tendency as alumina which is a paraelectric body. That is, the dielectric constant $\varepsilon r$ and the dielectric loss factor $\tan \delta$ of the electromagnetic wave absorptive heat generating body are increased along with an increase in temperature. Accordingly, the absorbed electric power Pab of the electromagnetic wave absorptive heat generating body is increased along with an increase in temperature. When heating causes variation in temperature distribution, the extent of the variation becomes significant as the temperature of the electromagnetic wave absorptive heat generating body is increased. As described above, the exhaust catalyst 52 of the first heating device has a characteristic such that the amount of absorbed electromagnetic wave is increased (the absorbance is increased) as the temperature of the catalyst is increased. Hereinafter, operation of the first heating device will be described based on the characteristic.

The catalyst coat layer 52c includes a porous oxide that contains catalytic metal. An oxide such as alumina, ceria, zirconia, and titania, or a compound oxide made of a plurality of kinds of the oxides is used as the porous oxide. One kind or a plurality of kinds selected from platinum group precious metals such as Pt, Rh, Pd, Ir, and Ru is used as the catalytic metal. The catalyst 52 is a so-called three-way catalyst and can remove hydrocarbon, nitric oxide, and nitrogen oxide from exhaust gas passing therethrough by converting hydrocarbon, nitric oxide, and nitrogen oxide into nitrogen, water, and carbon dioxide by reduction-oxidation reaction.

Instead of the configuration of the catalyst 52 in which the electromagnetic wave absorbing layer 52b and the catalyst coat layer 52c are stacked on the base material 52a, the catalyst coat layer 52c containing the electromagnetic wave absorptive heat generating body may be stacked on the base material 52a. The catalyst 52 may be manufactured by mixing the electromagnetic wave absorptive heat generating body and the catalyst material with the base material 52a before sintering the base material 52a and then, sintering the mixed material.

The heating device includes an antenna 61, a microwave transmission and reception device 62, and microwave cables 66a, 66b, 66c, 66d.

While the microwave broadly refers to an electromagnetic wave having a wavelength of 1 m to 1 mm (the oscillation frequency is 300 MHz to 300 GHz), the first heating device uses an electromagnetic wave in 2.45 GHz band (so-called ISM band). The wavelength of the electromagnetic wave in the frequency band is approximately 12 cm (for example, 12.2 cm in 2.45 GHz band). The wavelength is for illustrative purposes. A wavelength that is used in a heating device according to an aspect of the present invention is not limited to the wavelength.

The antenna 61 is configured with four individual antennas 61a, 61b, 61c, 61d in the present embodiment. Each of the individual antennas 61a, 61b, 61c, 61d has an approximately cylindrical shape. The antenna 61 is disposed in the direction toward the center (inward in the diameter direction) of an outer circumferential surface 51c from the outer circumferential surface 51c of the housing 51 on the exhaust entrance side (exhaust upstream side) of the catalyst 52. The four antennas 61a, 61b, 61c, 61d are disposed to divide the outer circumference of the housing 51 into four on a plane perpendicular to the central axis of the outer circumferential surface 51c. The plane is illustrated as an imaginary plane 61e by a broken line. That is, the four antennas are symmetrically disposed about the central axis of the outer circumferential surface 51c per 90° on the imaginary plane 61e. The distance between the tip ends of the opposing antennas (for example, 61a and 61c) is preferably approximately 50 mm to 150 mm and more preferably approximately 100 mm.

The exhaust upstream side end surface 52e of the catalyst 52 and the antenna 61 (or the imaginary plane 61e) are separated from each other at an appropriate distance (approximately a few tens of mm). For example, the reason is because when the distance between the exhaust upstream side end surface 52e of the catalyst 52 and the antenna 61 is excessively short, the microwave output from the antenna 61 is not diffused until reaching the exhaust upstream side end surface 52e, and the electric field distribution on the catalyst 52 is increased. When the distance is excessively long, the intensity of the microwave is decreased before the microwave radiated from the antenna 61 reaches the exhaust upstream side end surface 52e. Thus, the heat generation efficiency of the electromagnetic wave absorbing layer 52b is decreased. The distance between the exhaust upstream side end surface 52e and the antenna 61 is preferably approximately 5 mm to 20 mm and more preferably approximately 10 mm.

The position where the antenna 61 is disposed may be on the exhaust exit portion 51b side (exhaust downstream side) of the catalyst 52. However, when the exhaust exit portion 51b side of the catalyst 52 is heated by the microwave, the generated heat propagates to the downstream side by the flow of the exhaust gas. Thus, the generated heat does not contribute to heating of the entire catalyst. When the antenna 61 is disposed on the exhaust entrance portion 51a side of the catalyst 52 as in the present embodiment, heat that is generated by heating the exhaust entrance portion 51a side of the catalyst 52 by the microwave may contribute to heating of the entire catalyst. Accordingly, the position where the antenna 61 is disposed is more preferably on the exhaust entrance portion 51a side of the catalyst 52.

First ends of the microwave cables 66a, 66b, 66c, 66d are electrically connected to the antennas 61a, 61b, 61c, 61d respectively. A second end of each of the microwave cables 66a, 66b, 66c, 66d is electrically connected to the corresponding microwave transmission and reception device 62. That is, microwave transmission and reception devices 62a, 62b, 62c, 62d are respectively connected to the antennas 61a, 61b, 61c, 61d.

The microwave transmission and reception device 62 (62a, 62b, 62c, 62d) includes a microwave generator 63 (63a, 63b, 63c, 63d), a microwave detector 64 (64a, 64b, 64c, 64d), and a circulator 65 (65a, 65b, 65c, 65d).

The microwave generator 63 can generate microwaves having at least four kinds of oscillation frequencies by oscillation. The intensity and phase of oscillation can be changed per microwave of each oscillation frequency. The microwave generator 63 may include at least four oscillators having different oscillation frequencies, or may include four or more oscillators configured to be capable of changing the frequency. In the first embodiment, each of the four microwave generators 63a, 63b, 63c, 63d includes an oscillator that is configured to be capable of changing the frequency in order to generate microwaves having the same oscillation frequency by oscillation or generate microwaves having different oscillation frequencies by oscillation. Each oscillator may be separately disposed as illustrated in FIG. 1 or may be collectively disposed in one device.

The microwave detector 64 can amplify the intensity (the electric field strength, the magnetic field strength, or the electric power density) of the received (input) microwave by an amplifier and detect the amplified intensity of the received microwave. The microwave detector 64 includes (at least four kinds of) bandpass filters respectively corresponding to the oscillation frequencies in order to separate the electromagnetic waves having different oscillation frequencies from each other. The microwave detector 64 may be separately disposed as illustrated in FIG. 1 or may be collectively disposed in one device.

The circulator 65 allows a signal to be output to a port where the antenna 61 is connected, from a port where the microwave generator 63 is connected. The circulator 65 allows a signal to be output to a port where the microwave detector 64 is connected, from the port where the antenna 61 is connected. Accordingly, the microwave transmission and reception device 62 can radiate the microwave generated by oscillation by the microwave generator 63 from the antenna 61, and measure the intensity of the microwave (a reflective wave or the like) received by (incident on) the antenna 61 by the microwave detector 64.

Each of the microwave cables 66a, 66b, 66c, 66d uses a microwave coaxial cable. For example, the microwave coaxial cable is a cable configured by covering the outer circumference of an internal conductive body having a circular section with an insulating body, covering the outer circumference of the insulating body with an external conductive body coaxially with the insulating body, and forming a protective cladding around the external conductive body. For example, copper wires are used as the internal conductive body and the external conductive body. Polyethylene is used as the insulating body.

The microwave generator 63 can generate the microwave by oscillation or stop generating the microwave, change the intensity (amplitude) of the microwave, change the oscillation frequency, the phase, the output duty cycle, and the like of the microwave in accordance with an instruction from an electronic control device (ECU) 100 described below. The microwave generator 63 is broadly referred to as "electromagnetic wave generator 63".

The shape of the antenna 61 is not limited to an approximately cylindrical shape and may be a plate shape. The shape of the antenna 61 does not need to be a linear shape and may be a shape that is conceived for making the temperature distribution of the exhaust catalyst 52 uniform. The number of antennas in the antenna 61 is not limited to four. At least two antennas, each performing both transmission and reception, may be disposed in the antenna 61. In any case, it is desirable to consider arrangement of the antenna 61 such that the antenna 61 does not significantly impede the flow of the exhaust gas.

The electronic control device (ECU) 100 is an electronic circuit including a well-known microcomputer, and includes a CPU, a ROM, a RAM, a backup RAM, an interface, and the like. ECU is the abbreviation for electronic control unit. The electronic control device 100 is electrically connected to the engine actuator, the microwave generator 63, and the like, and transmits an instruction (drive) signal to the engine actuator and the microwave generator 63 in accordance with an instruction from the CPU. The electronic control device 100 is electrically connected to the microwave detector 64, and receives a signal (a signal is incident) from the microwave detector 64.

The CPU realizes various functions by executing instructions (routines) stored in a memory (ROM).

Summary of Operation

Principle of Estimating Temperature Distribution Using Reflective Wave

Figure 4:
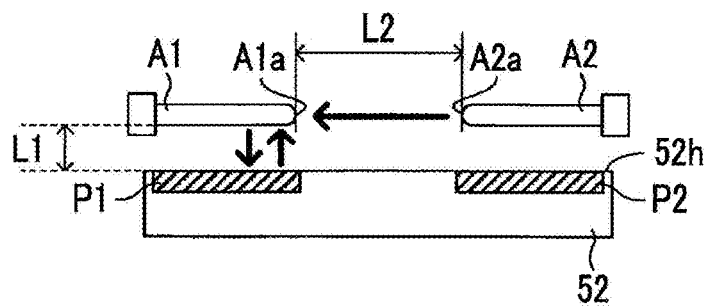
FIG. 4 is a diagram illustrating a simple model that describes an operating principle of the heating device illustrated in FIG. 1.

A principle of estimating the temperature distribution using a reflective wave will be described with reference to FIG. 4. In order to facilitate understanding of the principle, the principle will be described using a model in which two opposing antennas A1, A2 are disposed close to a surface 52h of the catalyst 52 as illustrated in FIG. 4. A distance L1 between each antenna and the surface 52h of the catalyst 52 is 10 mm, and a distance L2 between a tip end A1a of the antenna A1 and a tip end A2a of the antenna A2 is 100 mm.

As described above, the configuration illustrated in FIG. 1 enables both radiation and incidence of the electromagnetic wave in each antenna. For example, the antenna A1 radiates an electromagnetic wave having an intensity of 100, and the intensity of the electromagnetic wave radiated to a part P1 under the antenna A1 is 99 (the attenuation rate is As described above, the absorbed electric power Pab of the catalyst 52 is increased as the temperature is increased. For example, as illustrated in FIG. 3A and FIG. 3B, at an absolute temperature of 300 K to 570 K, the dielectric constant $\varepsilon r$ of LCMO at a frequency of 1 MHz is increased by approximately four times, and the dielectric loss factor tan $\delta$ is changed by approximately 20 times. Accordingly, the absorbed electric power Pab of the catalyst 52 is changed by approximately 80 times in the temperature range (300 K to 570 K) under a condition that the frequency f and the electric field strength E are constant.

Assuming that the microwave absorbance of the catalyst 52 is 5% at a low temperature and 95% at a high temperature in the model, the intensity of the microwave incident on the antenna A1 is calculated as follows.

(1) When a microwave having an intensity of 100 is radiated from the antenna A1 at a low catalyst temperature, the intensity of the microwave radiated to the part P1 is 99 (1% of 100 is attenuated) according to the assumption, and the intensity of the microwave absorbed by the catalyst 52 is 5 (95% of 99 is attenuated). Thus, the intensity of the microwave reflected by the catalyst 52 is 94 (=99−5). Assuming that 30% of the reflective wave is incident on (returns to) the antenna A1, the value of the intensity of the microwave incident on (returning to) the antenna A1 is 28 due to attenuation of 70% from 94.

(2) When a microwave having an intensity of 100 is radiated from the antenna A1 at a high catalyst temperature, the intensity of the microwave radiated to the part P1 is 99 (1% of 100 is attenuated) according to the assumption, and the intensity of the microwave absorbed by the catalyst 52 is 94 (5% of 99 is attenuated). Thus, the intensity of the microwave reflected by the catalyst 52 is 5 (=99−94). The value of the intensity of the microwave incident on (returning to) the antenna A1 is 1.5 due to attenuation of 70% from 5.

As described above, a significant difference occurs between the intensity of the incident reflective wave at a low temperature and the intensity of the incident reflective wave at a high temperature. Meanwhile, the antenna A2 radiates a microwave having an intensity of 100, and the intensity of the microwave radiated to a part P2 under the antenna A2 that is at a distance of 10 mm from the antenna A2 is 99 (the attenuation rate is 1%). The intensity of the microwave is inversely proportional to the square of the distance. Thus, the intensity of the microwave that is incident on the antenna A1 at a distance of 100 mm from the antenna A2 is 1 (the attenuation rate is 99%).

The total of the intensity of the microwave incident on the antenna A1 is calculated as follows. (1) The intensity of the reflective wave of the microwave radiated from the antenna A1 at a low catalyst temperature is 93. The intensity of the incident microwave radiated from the antenna A2 is 1. Approximately 1.1% of the intensity of the microwave incident on the antenna A1 is originated from the antenna A2. (2) The intensity of the reflective wave of the microwave radiated from the antenna A1 at a high catalyst temperature is 5. The intensity of the incident microwave radiated from the antenna A2 is 1. Approximately 20% of the intensity of the microwave incident on the antenna A1 is originated from the antenna A2.

Accordingly, the effect of the microwave radiated from the adjacent antenna cannot be ignored at a high catalyst temperature.

Temperature-Correlated Value

Figure 5:
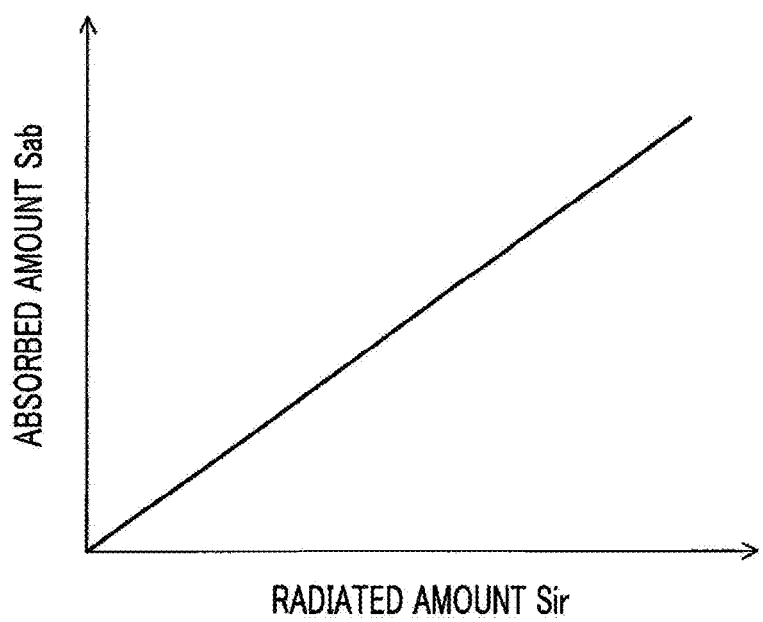
FIG. 5 is a graph illustrating a relationship between the amount of electromagnetic wave radiated to the exhaust catalyst illustrated in FIG. 1, and the amount of electromagnetic wave absorbed by the exhaust catalyst.

When the temperature of the exhaust catalyst 52 is constant, a radiated microwave amount Sir and an absorbed microwave amount Sab are in a proportional relationship as illustrated in FIG. 5. Accordingly, even when the radiated microwave amount Sir is changed under a condition that the temperature of the exhaust catalyst 52 is constant, the ratio Sab/Sir of the absorbed microwave amount Sab to the radiated microwave amount Sir, that is, the microwave absorbance, is constant. That is, the temperature of the exhaust catalyst 52 is changed when the microwave absorbance Sab/Sir is changed.

When the intensity of the microwave that is radiated from the antenna A1, reflected without being absorbed in the exhaust catalyst 52, and input into the antenna A1 is denoted by Sre, a microwave reflectance Rre that is the ratio of the reflected microwave to the microwave radiated from the antenna A1 is acquired by General Formula (2). A microwave absorbance Rab is acquired by General Formula (3).

$$\text{Microwave reflectance } Rre = Sre/Sir \quad (2)$$

$$\text{Microwave absorbance } Rab = (Sir - Sre)/Sir \quad (3)$$

Figure 6A:
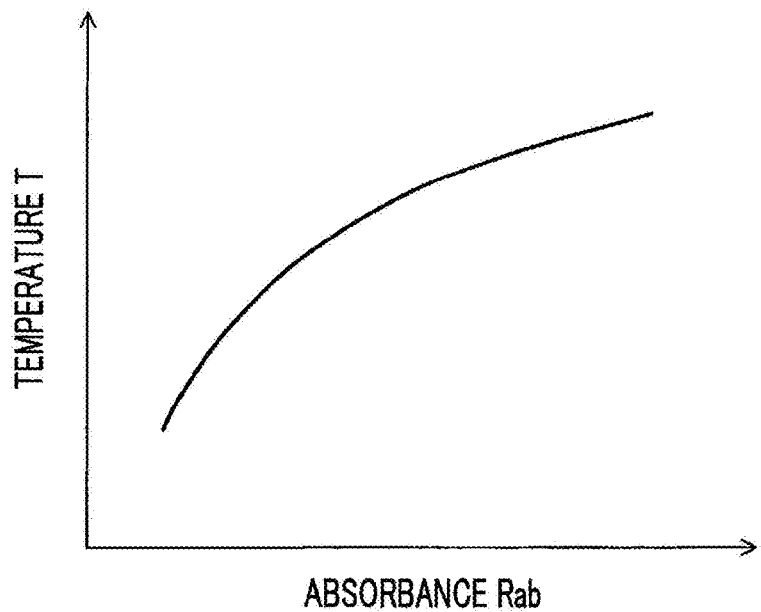
FIG. 6A is a graph illustrating a relationship between the temperature and the electromagnetic wave absorbance of the exhaust catalyst illustrated in FIG. 1.

As described above, as the temperature of the exhaust catalyst 52 is increased, the microwave absorbance Rab of the exhaust catalyst 52 is increased. Accordingly, a relationship in which the temperature of the exhaust catalyst 52 is increased as the microwave absorbance Rab is increased is established as illustrated in FIG. 6A. Thus, the temperature of the exhaust catalyst 52 can be estimated from the microwave absorbance Rab. As described above, the microwave absorbance Rab is one of "temperature-correlated values" that are values correlated with the temperature of the exhaust catalyst 52.

Figure 6B:
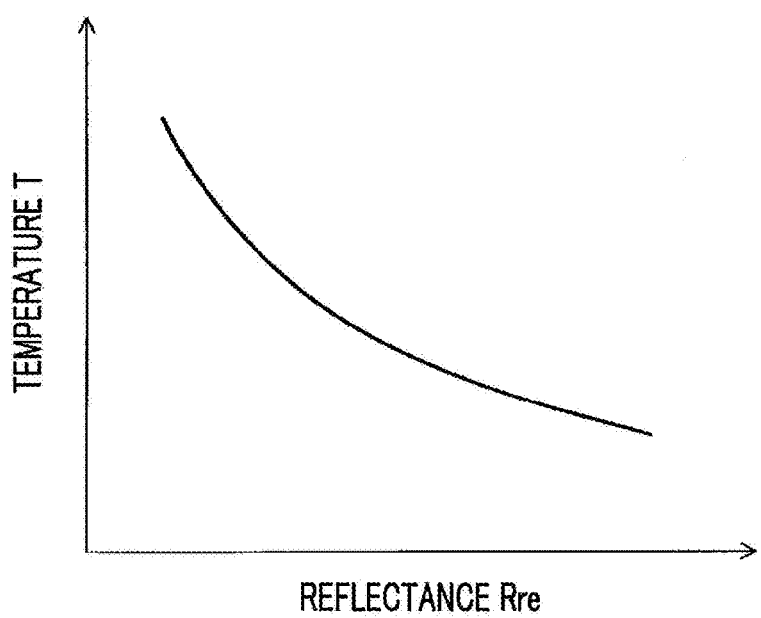
FIG. 6B is a graph illustrating a relationship between the temperature and the electromagnetic wave reflectance of the exhaust catalyst.

A relationship in which the temperature of the exhaust catalyst 52 is decreased as the microwave reflectance Rre is increased is established as illustrated in FIG. 6B. Thus, the temperature of the exhaust catalyst 52 can be estimated from the microwave reflectance Rre. As described above, the microwave reflectance Rre is one of "temperature-correlated values" that are values correlated with the temperature of the exhaust catalyst 52.

Principle of Estimating Temperature Distribution Using Reflective Wave

Figure 7:
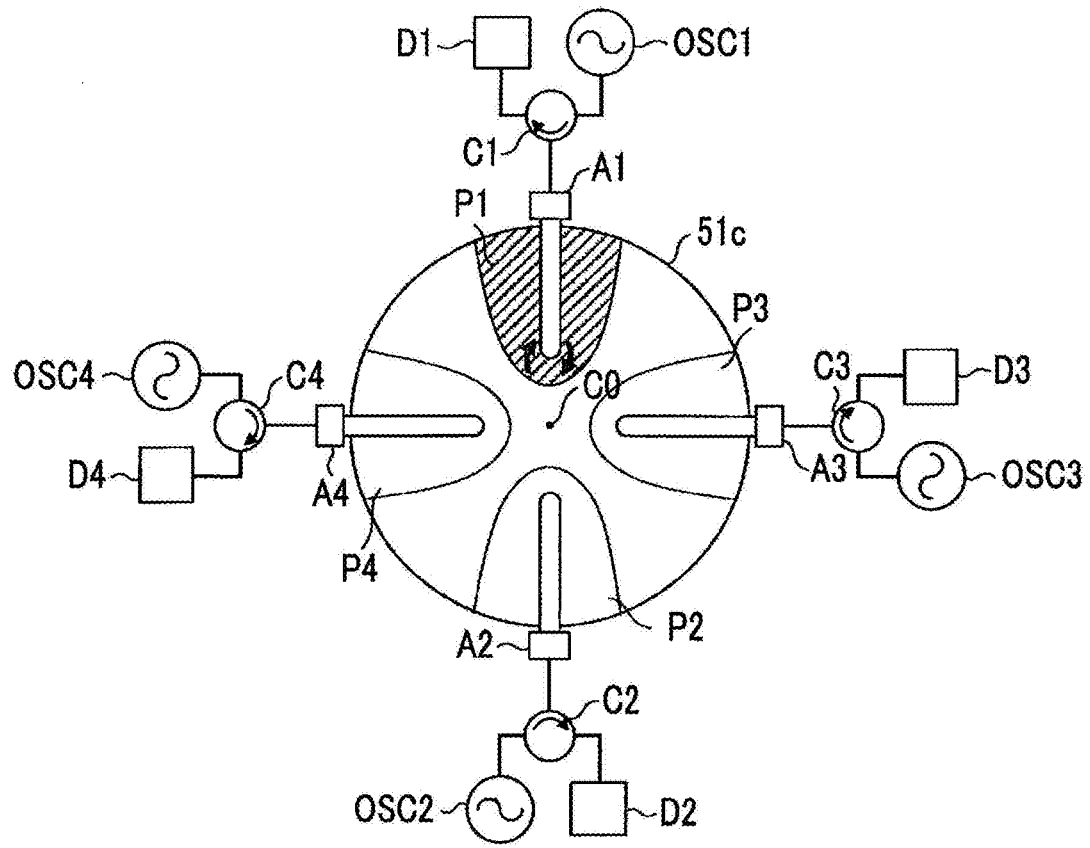
FIG. 7 is a diagram for describing the operation of a temperature-correlated value acquisition control of the first heating device illustrated in FIG. 1.

As illustrated in FIG. 7, in a see-through view (sectional view) of the antenna 61 and the exhaust catalyst 52 seen from the exhaust entrance portion 51a side, the four antennas 61a, 61b, 61c, 61d are respectively denoted by reference signs A1, A3, A2, A4 for convenience. The four microwave generators 63a, 63b, 63c, 63d are respectively denoted by reference signs OSC1, OSC3, OSC2, OSC4 for convenience. The four microwave detectors 64a, 64b, 64c, 64d are respectively denoted by reference signs D1, D3, D2, D4 for convenience. The four circulators 65a, 65b, 65c, 65d are respectively denoted by reference signs C1, C3, C2, C4 for convenience.

The microwave generators OSC1 to OSC4 and the microwave detectors D1 to D4 are respectively connected to the antennas A1 to A4 through the circulators C1 to C4. The microwave generator OSC1, the microwave detector D1, and the circulator C1 are included in one microwave transmission and reception device 62a.

The antenna A1, the antenna A2, the antenna A3, and the antenna A4 are disposed close to the first part P1 of the exhaust catalyst 52, the second part P2 the exhaust catalyst 52, a third part P3 of the exhaust catalyst 52, and a fourth part P4 of the exhaust catalyst 52 respectively. The antennas A1 to A4 are disposed toward a center C0 of the exhaust catalyst 52 from the outer circumferential surface 51c. In the first embodiment, the distance between the antenna An (n=1, 2, 3, and 4) and the n-th part Pn is 10 mm, and the distance between the tip ends of the opposing antennas An is 100 mm.

Method of Acquiring Temperature-Correlated Value Using First Heating Device

A method of estimating the temperature of parts of the exhaust catalyst 52 (the first part P1, the second part P2, and the like) close to each antenna 61 using the first heating device, that is, a method of acquiring the temperature-correlated value for the parts close to each antenna 61, will be more specifically described using the principle.

Hereinafter, among the first part P1 to the fourth part P4 respectively close to the four antennas A1 to A4, the temperature of the first part P1 will be illustratively described as being lower than the temperature of the other parts.

First, as a "specific radiation control", the first heating device (the CPU of the ECU 100) executes a "first radiation control" for radiating the microwave from merely the antenna A1. In such a case, configuring the antennas A2, A3, A4 not radiating the microwave to exhibit total internal reflection can suppress leakage of the electromagnetic wave to the antennas A2, A3, A4 from the antenna A1. The same applies to the onward specific radiation control. In such a case, since the temperature of the first part P1 is lower than the temperature of the other parts, the microwave absorbance in the first part P1 is lower than the microwave absorbance in the other parts (the second part P2 to the fourth part P4).

The CPU acquires the intensity of the microwave incident on the antenna A1 as a "first electromagnetic wave intensity" using the microwave detector D1. Since the microwave absorbance in the first part P1 is lower than the microwave absorbance in the other parts, the value of the "first electromagnetic wave intensity" is comparatively high.

Based on the first electromagnetic wave intensity, the CPU acquires a "first temperature-correlated value" that is a value correlated with the temperature of the first part P1. In such a case, the CPU acquires the microwave absorbance as the first temperature-correlated value based on General Formula (2). The CPU may acquire the temperature of the first part P1 using the correlation map (lookup table) illustrated in FIG. 6A.

Next, the CPU executes a "second radiation control" for radiating the microwave from merely the antenna A2 as the "specific radiation control". In such a case, the microwave absorbance in the second part P2 is higher than the microwave absorbance in the first part P1 and is approximately the same as (average value of) the microwave absorbance in the third part P3 and the fourth part P4.

The CPU acquires the intensity of the microwave incident on the antenna A2 as a "second electromagnetic wave intensity" using the microwave detector D2. Since the microwave absorbance in the second part P2 is higher than the microwave absorbance in the first part P1 and is approximately the same as (average value of) the microwave absorbance in the third part P3 and the fourth part P4, the value of the "second electromagnetic wave intensity" is lower than (approximately half of) the "first electromagnetic wave intensity".

Based on the second electromagnetic wave intensity, the CPU acquires a "second temperature-correlated value" that is a value correlated with the temperature of the second part P2. In such a case, the CPU acquires the microwave absorbance as the second temperature-correlated value based on General Formula (2). The CPU may acquire the temperature of the second part P2 using the correlation map illustrated in FIG. 6A.

The CPU executes a "third radiation control" for radiating the microwave from merely the antenna A3 as the "specific radiation control". In such a case, the microwave absorbance in the third part P3 is higher than the microwave absorbance in the first part P1 and is approximately the same as (average value of) the microwave absorbance in the second part P2 and the fourth part P4.

The CPU acquires the intensity of the microwave incident on the antenna A3 as a "third electromagnetic wave intensity" using the microwave detector D3. Since the microwave absorbance in the third part P3 is higher than the microwave absorbance in the first part P1 and is approximately the same as (average value of) the microwave absorbance in the second part P2 and the fourth part P4, the "third electromagnetic wave intensity" has approximately the same value as the "second electromagnetic wave intensity".

Based on the third electromagnetic wave intensity, the CPU acquires a "third temperature-correlated value" that is a value correlated with the temperature of the third part P3. In such a case, the CPU acquires the microwave absorbance as the third temperature-correlated value based on General Formula (2). The CPU may acquire the temperature of the third part P3 using the correlation map illustrated in FIG. 6A.

The CPU executes a "fourth radiation control" for radiating the microwave from merely the antenna A4 as the "specific radiation control". In such a case, the microwave absorbance in the fourth part P4 is higher than the microwave absorbance in the first part P1 and is approximately the same as (average value of) the microwave absorbance in the second part P2 and the third part P3.

The CPU acquires the intensity of the microwave incident on the antenna A4 as a "fourth electromagnetic wave intensity" using the microwave detector D4. Since the microwave absorbance in the fourth part P4 is higher than the microwave absorbance in the first part P1 and is approximately the same as (average value of) the microwave absorbance in the second part P2 and the third part P3, the "fourth electromagnetic wave intensity" has approximately the same value as the "second electromagnetic wave intensity" and the "third electromagnetic wave intensity".

Based on the fourth electromagnetic wave intensity, the CPU acquires a "fourth temperature-correlated value" that is a value correlated with the temperature of the fourth part P4. In such a case, the CPU acquires the microwave absorbance as the fourth temperature-correlated value based on General Formula (2). The CPU may acquire the temperature of the fourth part P4 using the correlation map illustrated in FIG. 6A.

To summarize the intensity of the reflective wave, when the first radiation control (a control for radiating the microwave from merely the antenna A1) is executed, the value of the first electromagnetic wave intensity is comparatively high as illustrated in Table 1. When the other radiation controls are executed, the values of the second electromagnetic wave intensity, the third electromagnetic wave intensity, and the fourth electromagnetic wave intensity are approximately moderate.

TABLE 1

| Specific Radiation Control | Reflective Wave Intensity | | | |
| --- | --- | --- | --- | --- |
| | A1 | A2 | A3 | A4 |
| First Radiation Control (Radiation from A1) | High | — | — | — |
| Second Radiation Control (Radiation from A2) | — | Moderate | — | — |
| Third Radiation Control (Radiation from A3) | — | — | Moderate | — |
| Fourth Radiation Control (Radiation from A4) | — | — | — | Moderate |

The result of summarization of the intensity of the reflective wave When the temperature of the first part P1, among the first part P1 to the fourth part P4 respectively close to the four antennas A1 to A4, is higher than the temperature of the other parts is illustrated in Table 2. When the first radiation control (a control for radiating the microwave from merely the antenna A1) is executed, the value of the first electromagnetic wave intensity is comparatively low When the other radiation controls are executed, the values of the second electromagnetic wave intensity, the third electromagnetic wave intensity, and the fourth electromagnetic wave intensity are approximately moderate.

TABLE 2

| Specific Radiation Control | Reflective Wave Intensity | | | |
| --- | --- | --- | --- | --- |
| | A1 | A2 | A3 | A4 |
| First Radiation Control (Radiation from A1) | Low | — | — | — |
| Second Radiation Control (Radiation from A2) | — | Moderate | — | — |
| Third Radiation Control (Radiation from A3) | — | — | Moderate | — |
| Fourth Radiation Control (Radiation from A4) | — | — | — | Moderate |

Figure 8:
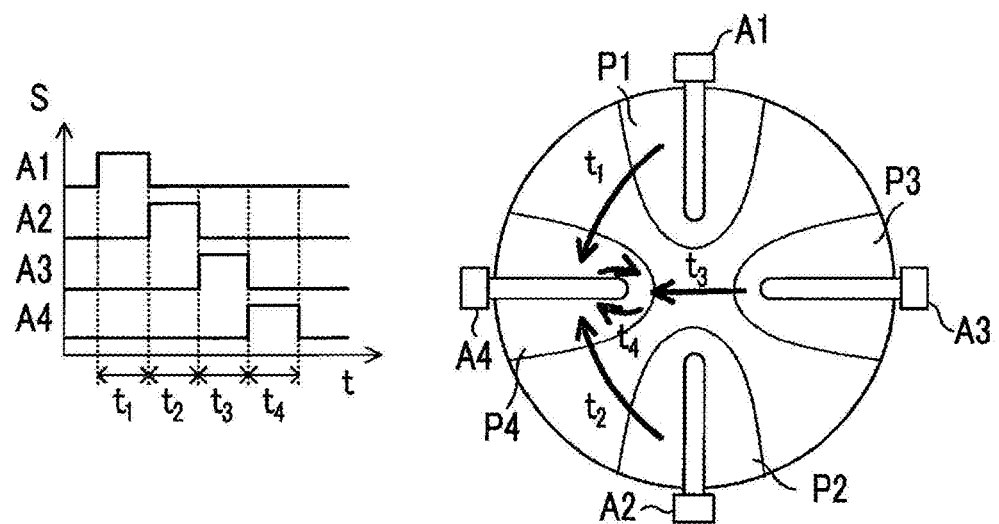
FIG. 8 is a diagram for schematically describing the temperature-correlated value acquisition control performed by the first heating device illustrated in FIG. 1.

According to such a method, as illustrated in FIG. 8, a microwave having a first predetermined intensity s radiated from the antenna A1 in a period $t_1$. A microwave having a second predetermined intensity is radiated from the antenna. A2 in a period $t_2$. A microwave having a third predetermined intensity is radiated from the antenna A3 in a period $t_3$. A microwave having a fourth predetermined intensity is radiated from the antenna A4 in a period $t_4$. The first predetermined intensity to the fourth predetermined intensity are the same as each other. For example, each radiation time period (radiation period) is 1 msec. Accordingly, microwaves from different antennas are incident in order on the antenna A4 per predetermined period. As described above, the first heating device can specify each antenna from which each microwave is radiated, by associating the order of the radiated microwaves with the positions of the antennas.

Specific Operation

Figure 9:
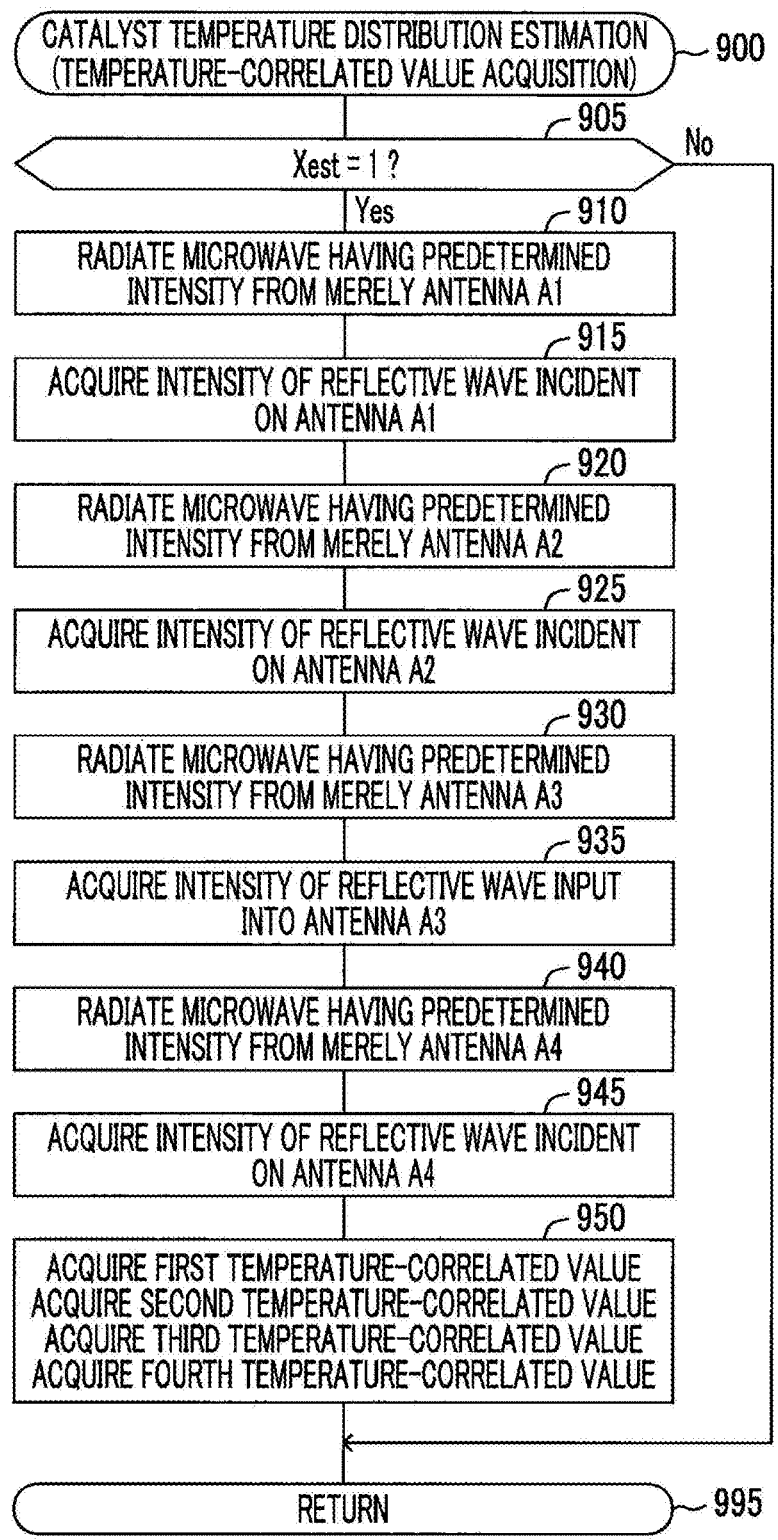
FIG. 9 is a flowchart illustrating a "catalyst temperature distribution estimation routine" that is executed by a CPU of an ECU illustrated in FIG. 1.

The CPU of the ECU 100 executes a catalyst temperature distribution estimation routine illustrated by a flowchart in FIG. 9 for each elapse of a predetermined time period. Accordingly, when a predetermined timing is reached, the CPU starts processing from step 900 in FIG. 9 and transitions to step 905 to determine whether or not the value of a catalyst temperature distribution estimation execution flag Xest is equal to "1".

The value of the catalyst temperature distribution estimation execution flag Xest is set to "1" in a routine that is separately executed. For example, the catalyst temperature distribution estimation execution flag Xest is set to "1" when an ignition switch or a start switch not illustrated is switched to an ON state from an OFF state.

The catalyst temperature distribution estimation execution flag Xest is set to "1" per few seconds while the CPU is executing a catalyst temperature increasing control for increasing the temperature of the catalyst 52 by heating. Accordingly, the catalyst temperature distribution can be monitored very frequently during the catalyst temperature increasing control so that the temperature of the catalyst 52 is not excessively increased. At idling, the catalyst temperature distribution estimation execution flag Xest is set to "1" a few times per one minute. At steady operation, the catalyst temperature distribution estimation execution flag Xest is set to "1" at time intervals set in advance (for example, every five minutes).

When the catalyst temperature distribution estimation execution flag Xest is set to "1", the CPU makes a "Yes" determination in step 905 and processes step 910 to step 950 described below in order. Then, the CPU transitions to step 995 to temporarily finish the present routine.

Step 910: The CPU causes merely the antenna A1 (61*a*) to radiate a microwave having a predetermined intensity. That is, the CPU causes the microwave generator OSC1 (63*a*) to generate a microwave by oscillation and causes the microwave generators OSC2 (63*c*), OSC3 (63*b*), OSC4 (63*d*) to stop oscillation.

Step 915: The CPU measures, by the microwave detector D1 (64*a*), the intensity of the reflective wave that is input into the antenna A1. (61*a*), and acquires the measured intensity as the first electromagnetic wave intensity.

Step 920: The CPU causes merely the antenna A2 (61*c*) to radiate a microwave having a predetermined intensity. That is, the CPU causes the microwave generator OSC2 (63*c*) to generate a microwave by oscillation and causes the microwave generators OSC1 (63*a*), OSC3 (63*b*), OSC4 (63*d*) to stop oscillation.

Step 925: The CPU measures, by the microwave detector D2 (64*c*), the intensity of the reflective wave that is input into the antenna A2 (61*c*), and acquires the measured intensity as the second electromagnetic wave intensity.

Step 930: The CPU causes merely the antenna A3 (61*b*) to radiate a microwave having a predetermined intensity. That is, the CPU causes the microwave generator OSC3 (63*b*) to generate a microwave by oscillation and causes the microwave generators OSC1 (63*a*), OSC2 (63*c*), OSC4 (63*d*) to stop oscillation.

Step 35: The CPU measures, by the microwave detector D3 (64*b*), the intensity of the reflective wave that is input into the antenna A3 (61*b*), and acquires the measured intensity as the third electromagnetic wave intensity.

Step 940: The CPU causes merely the antenna A4 (61*d*) to radiate a microwave having a predetermined intensity. That is, the CPU causes the microwave generator OSC4 (63*d*) to generate a microwave by oscillation and causes the microwave generators OSC1 (63*a*), OSC2 (63*c*), OSC3 (63*b*) to stop oscillation.

Step 945: The CPU measures, by the microwave detector 134 (64*d*), the intensity of the reflective wave that is input into the antenna. A4 (61*d*), and acquires the measured intensity as the fourth electromagnetic wave intensity.

Step 950: The CPU acquires the first temperature-correlated value, the second temperature-correlated value, the third temperature-correlated value, and the fourth temperature-correlated value based on the acquired first electromagnetic wave intensity, the second electromagnetic wave intensity, the third electromagnetic wave intensity, and the fourth electromagnetic wave intensity respectively, and transitions to step 995 to temporarily finish the present routine.

When the catalyst temperature distribution estimation execution flag Xest is equal to "0", and the CPU makes a "No" determination in step 905, the CPU directly transitions to step 995 to temporarily finish the present routine.

As described above, in the temperature-correlated value acquisition control, the CPU executes, as the specific radiation control, the first radiation control for controlling the operation of the microwave generators OSC1 to OSC4 to set a radiation state where the electromagnetic wave is radiated to the first part P1 from the first antenna A1, and where electromagnetic waves are not radiated to the second part P2, the third part P3, and the fourth part P4 respectively from the second antenna A2, the third antenna A3 and the fourth antenna A4. The CPU acquires, as the first electromagnetic wave intensity, the intensity of the electromagnetic wave that is incident on the first antenna A1 at the execution of the first radiation control.

Next, the CPU executes, as the specific radiation control, the second radiation control for controlling the operation of the microwave generators OSC1 to OSC4 to set a radiation state where the electromagnetic wave is radiated to the second part P2 from the second antenna A2, and where electromagnetic waves are not radiated to the first part P1, the third part P3, and the fourth part P4 respectively from. The first antenna A1, the third antenna A3, and the fourth antenna A4. The CPU acquires, as the second electromagnetic wave intensity, the intensity of the electromagnetic wave that is incident on the second antenna A2 at the execution of the second radiation control.

Next, the CPU executes, as the specific radiation control, the third radiation control for controlling the operation of the microwave generators OSC1 to OSC4 to set a radiation state where the electromagnetic wave is radiated to the third part P3 from the third antenna A3, and where electromagnetic waves are not radiated to the first part P1, the second part P2, and the fourth part P4 respectively from the first antenna A1, the second antenna A2, and the fourth antenna A4. The CPU acquires, as the third electromagnetic wave intensity, the intensity of the electromagnetic wave that is incident on the third antenna A3 at the execution of the third radiation control.

Next, the CPU executes, as the specific radiation control, the fourth radiation control for controlling the operation of the microwave generators USC1 to OSC4 to set a radiation state where the electromagnetic wave is radiated to the fourth part P4 from the fourth antenna A4, and where electromagnetic waves are not radiated to the first part P1, the second part P2, and the third part P3 respectively from the first antenna A1, the second antenna A2, and the third antenna A3. The CPU acquires, as the fourth electromagnetic wave intensity, the intensity of the electromagnetic wave that is incident on the fourth antenna A4 at the execution of the fourth radiation control.

As described above, the first heating device can acquire the intensity of the electromagnetic wave radiated from each antenna without being affected by the electromagnetic wave from the other antennas. Thus, the first heating device can accurately acquire the temperature of a specific part (temperature-correlated value) of the catalyst 52 and estimate the temperature distribution of the catalyst 52.

Catalyst Temperature Increasing Control

Figure 10:
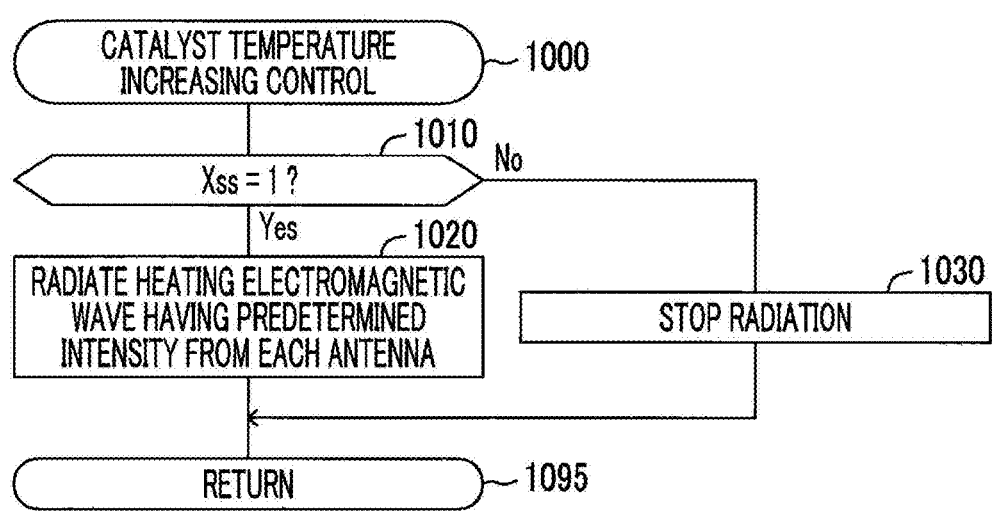
FIG. 10 is a flowchart illustrating a "catalyst temperature increasing control routine" that is executed by the CPU of the ECU illustrated in FIG. 1.

The first heating device executes the temperature increasing control of the exhaust catalyst 52 using the following method. The CPU of the ECU 100 executes a catalyst temperature increasing control routine illustrated by a flowchart in FIG. 10 for each elapse of a predetermined time period. Accordingly, when a predetermined timing is reached, the CPU starts processing from step 1000 in FIG. 10 and transitions to step 1010 to determine whether or not the value of a catalyst temperature increasing flag Xss is equal to "1".

For example, the value of the catalyst temperature increasing flag Xss is changed to "1" from "0" when any of the following two conditions is established. A first condition is that the ignition switch or the start switch not illustrated is switched to the ON state from the OFF state. A predetermined temperature range (predetermined range) for normal functioning of the exhaust catalyst 52 is set for the exhaust catalyst 52. The lower limit of the temperature range is regulated with a temperature (activation temperature) at which the exhaust catalyst 52 can sufficiently exhibit a capability to control the exhaust gas. The upper limit of the temperature range is regulated with a temperature that is acquired by considering the risk of loss of the exhaust catalyst 52 by melting. Therefore, a second condition is that a temperature-correlated value $CVn$ becomes equal to the temperature-correlated value $CVn$ that corresponds to a case where the temperature of the exhaust catalyst 52 (hereinafter, referred to as "catalyst temperature") is lower than the predetermined temperature range (lower than the temperature lower limit).

In determination as to whether or not the catalyst temperature is lower than the temperature lower limit, for example, the first heating device performs the determination based on an average value $CVavg$ of a first temperature-correlated value $CV1$, a second temperature-correlated value $CV2$, a third temperature-correlated value $CV3$, and a fourth temperature-correlated value $CV4$. The average value $CVavg$ is represented by the following general formula.

$$CVavg=(CV1+CV2+CV3+CV4)/4 \quad (4)$$

When any of the two conditions is established, that is, when the catalyst temperature increasing flag Xss is equal to "1", the CPU makes a "Yes" determination in step 1010 and transitions to step 1020 to cause each antenna to radiate an electromagnetic wave having a predetermined intensity for increasing the temperature of the catalyst. Then, the CPU transitions to step 1095 to temporarily finish the present routine.

For example, the value of the catalyst temperature increasing flag Xss is changed to "0" from "1" when any of the following two conditions is established. A first condition is that the ignition switch or the start switch is switched to the OFF state from the ON state. For example, a second condition is that the temperature-correlated value $CVn$ (average value $CVavg$) becomes equal to the temperature-correlated value $CVn$ (average value $CVavg$) that corresponds to a case where the catalyst temperature is higher than the predetermined temperature range (exceeds the temperature upper limit).

When the catalyst temperature increasing flag Xss is equal to "0", the CPU makes a "No" determination in step 1010 and transitions to step 1030 to stop radiation of the electromagnetic wave. Then, the CPU transitions to step 1095 to temporarily finish the present routine.

In the first heating device, while a determination as to whether to execute or stop the catalyst temperature increasing control is performed according to Whether the average value $CVavg$ of the temperature-correlated value $CVn$ is lower or higher than the predetermined temperature range, the heating device according to an aspect of the present invention may be configured to individually perform the determination for each temperature-correlated value $CVn$ and individually control the intensity of the microwave radiated from each antenna.

A method of reducing temperature variation using the first heating device will be described.

First Method of Correcting Variation in Catalyst Temperature

The first heating device can acquire each temperature-correlated value for each part (the first part P1 to the fourth part P4) and then, can perform a control for reducing variation according to the magnitude of variation (deviation) in the catalyst temperature. For example, it is assumed that the first heating device is in a state of executing the catalyst temperature increasing control for radiating the microwave from each antenna.

When each temperature-correlated value is (1) a correlated value that is increased along with an increase in temperature (for example, the microwave absorbance), and the difference between each temperature-correlated value $CVn$ (n is 1, 2, 3, and 4) and the average value $CVavg$ of the temperature correlated values has a positive value ($CVn-CVavg>0$), the first heating device determines that the temperature of the "n-th part Pn" corresponding to each temperature-correlated value is high. In such a case, the first heating device decreases the intensity of the microwave radiated from the n-th antenna An by a predetermined amount in order to decrease the temperature of the n-th part Pn. Alternatively, the first heating device may stop radiation of the microwave.

When the difference between each temperature-correlated value $CVn$ and the average value $CVavg$ of the temperature-correlated values has a negative value ($CVn-CVavg<0$), the first heating device determines that the temperature of the "n-th part Pn" corresponding to each temperature-correlated value is low. In such a case, the first heating device increases the intensity of the microwave radiated from the n-th antenna. An by a predetermined amount in order to increase the temperature of the n-th part Pn.

When each temperature-correlated value is (2) a correlated value that is decreased along with an increase in temperature (for example, the microwave reflectance), and the difference between each temperature-correlated value $CVn$ and the average value $CVavg$ of the temperature correlated values has a negative value ($CVn-CVavg<0$), the first heating device determines that the temperature of the "n-th part Pn" corresponding to each temperature-correlated value is high. In such a case, the first heating device decreases the intensity of the microwave radiated from the n-th antenna An by a predetermined amount in order to decrease the temperature of the n-th part Pn. Alternatively, the first heating device may stop radiation of the microwave.

When the difference between each temperature-correlated value $CVn$ and the average value $CVavg$ of the temperature-correlated values has a positive value ($CVn-CVavg>0$), the first heating device determines that the temperature of the "n-th part Pn" corresponding to each temperature-correlated value is low. In such a case, the first heating device increases the intensity of the microwave radiated from the n-th antenna An by a predetermined amount in order to increase the temperature of the n-th part Pa.

By repeating such a method, the first heating device can approximate each temperature-correlated value to the average value $CVavg$. Accordingly, the deviation in the temperature-correlated value of each part, that is, the deviation in the temperature of each n-th part Pn can be decreased, and the risk of damage such as a crack caused by a difference in the temperature of the exhaust catalyst 52 can be reduced.

Second Method of Correcting Variation in Catalyst Temperature

As described above, while the first heating device can acquire each temperature-correlated value for each n-th part Pa and then, reduce variation (deviation) in catalyst temperature, the predetermined temperature range (predetermined range) for normal functioning of the catalyst 52 is set for the catalyst 52.

When each temperature-correlated value is (1) a correlated value that is increased along with an increase in temperature (for example, the microwave absorbance), the first heating device defines CVmin as the lower limit of each temperature-correlated value corresponding to the lower limit of the predetermined temperature range, and defines CVmax as the upper limit of each temperature-correlated value corresponding to the upper limit of the predetermined temperature range. When each temperature-correlated value CVn is higher than the upper limit CVmax of the temperature-correlated value, the first heating device determines that the temperature of the n-th part Pn corresponding to each temperature-correlated value exceeds the upper limit. In such a case, the first heating device decreases the intensity of the microwave radiated from the antenna An by a predetermined amount in order to decrease the temperature of the n-th part Pn. Alternatively, the first heating device may stop radiation of the microwave.

When each temperature-correlated value CVn is lower than the lower limit CVmin of the temperature-correlated value, the first heating device determines that the temperature of the n-th part Pn corresponding to each temperature-correlated value is lower than the lower limit. In such a case, the first heating device increases the intensity of the microwave radiated from the antenna An by a predetermined amount in order to increase the temperature of the nth part Pn.

When each temperature-correlated value is (2) a correlated value that is decreased along with an increase in temperature (for example, the microwave reflectance), the first heating device defines CVmax as the upper limit of each temperature-correlated value corresponding to the lower limit of the predetermined temperature range, and defines CVmin as the lower limit of each temperature-correlated value corresponding to the upper limit of the predetermined temperature range. When each temperature-correlated value CVn is lower than the lower limit CVmin of the temperature-correlated value, the first heating device determines that the temperature of the n-th part Pn corresponding to each temperature-correlated value exceeds the upper limit. In such a case, the first heating device decreases the intensity of the microwave radiated from the antenna An by a predetermined amount in order to decrease the temperature of the n-th part Pn. Alternatively, the first heating device may stop radiation of the microwave.

When each temperature-correlated value CVn is higher than the upper limit CVmax of the temperature-correlated value, the first heating device determines that the temperature of the n-th part Pn corresponding to each temperature-correlated value is lower than the lower limit. In such a case, the first heating device increases the intensity of the microwave radiated from the antenna. An by a predetermined amount in order to increase the temperature of the n-th part Pn.

Such a control for causing each temperature-correlated value to fall in the predetermined range (exclusion suppressing control) may be performed in combination with a control for reducing the deviation (deviation reducing control). In such a case, the exclusion suppressing control is executed before the deviation reducing control. Hereinafter, details will be described with reference to FIG. 11. In the following description, each temperature-correlated value is a correlated value that is increased along with an increase in temperature.

Specific Operation

Figure 11:
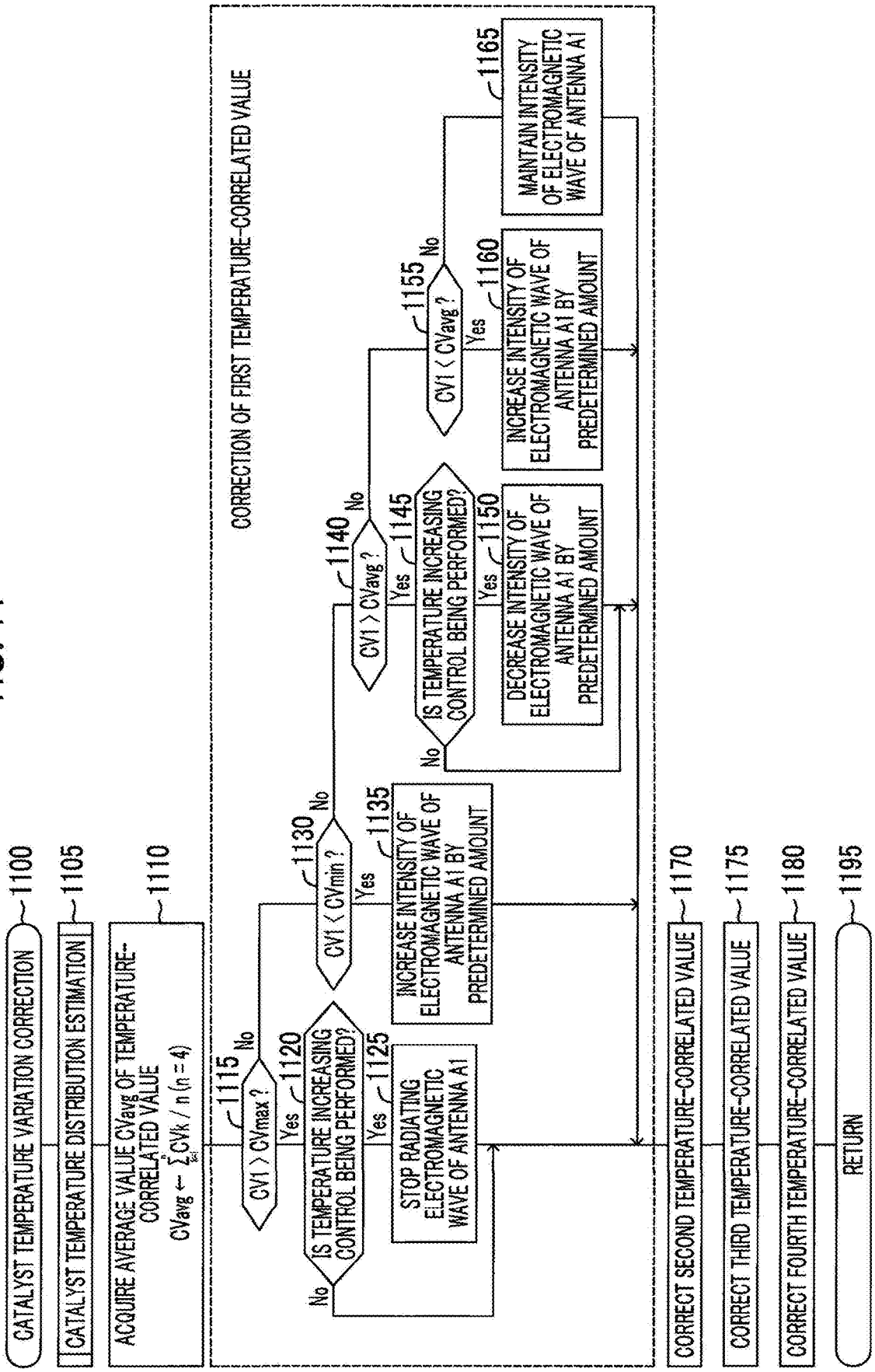
FIG. 11 is a flowchart illustrating a "catalyst temperature variation correction routine" that is executed by the CPU of the ECU illustrated in FIG. 1.

The CPU of the ECU 100 executes a catalyst temperature variation correction routine illustrated by a flowchart in FIG. 11 for each elapse of a predetermined time period. Accordingly, when a predetermined timing is reached, the CPU starts processing from step 1100 in FIG. 11 and transitions to step 1105 to execute the catalyst temperature distribution estimation (temperature-correlated value acquisition) routine. That is, the CPU transitions to step 900 to execute the catalyst temperature distribution estimation routine, and acquires each temperature-correlated value CVn. When the catalyst temperature distribution estimation routine is temporarily finished, the CPU transitions to step 1110.

When the CPU transitions to step 1110, the CPU acquires the average value CVavg of each temperature-correlated value based on General Formula (4). Then, the CPU transitions to step 1115 to determine whether or not the first temperature-correlated value CV1 is higher than the upper limit CVmax of each temperature-correlated value. When the first temperature-correlated value CV1 is higher than the upper limit CVmax of each temperature-correlated value, the CPU makes a "Yes" determination in step 1115 and transitions to step 1120 to determine whether or not the CPU is separately executing the "catalyst temperature increasing control".

When the CPU is executing the catalyst temperature increasing control, the CPU makes a "Yes" determination in step 1120 and transitions to step 1125 to stop the antenna A1 from radiating the electromagnetic wave. Then, the CPU transitions to step 1170. When the CPU is not executing the catalyst temperature increasing control, the CPU makes a "No" determination in step 1120 and directly transitions to step 1170.

When the first temperature-correlated value CV1 is lower than or equal to the upper limit CVmax of each temperature-correlated value, the CPU makes a "No" determination in step 1115 and transitions to step 1130 to determine whether or not the first temperature-correlated value CV1 is lower than the lower limit CVmin of each temperature-correlated value.

When the first temperature-correlated value CV1 is lower than the lower limit CVmin of each temperature-correlated value, the CPU makes a "Yes" determination in step 1130 and transitions to step 1135 to increase the intensity of the electromagnetic wave of the antenna A1 by a predetermined amount. Then, the CPU transitions to step 1170. When the first temperature-correlated value CV1 is higher than or equal to the lower limit CVmin of each temperature-correlated value, the CPU makes a "No" determination in step 1130 and transitions to step 1140. The CPU determines whether or not the first temperature-correlated value CV1 is higher than the average value CVavg of each temperature-correlated value CVn.

When the first temperature-correlated value CV1 is higher than the average value CVavg of each temperature-correlated value CVn, the CPU makes a "Yes" determination in step 1140 and transitions to step 1145 to determine whether or not the CPU is executing the catalyst temperature increasing control. When the CPU is executing the catalyst temperature increasing control, the CPU makes a "Yes" determination in step 1145 and transitions to step 1150 to decrease the intensity of the electromagnetic wave of the antenna A1 by a predetermined amount. Then, the CPU transitions to step 1170. When the CPU is not executing the catalyst temperature increasing control, the CPU makes a "No" determination in step 1145 and directly transitions to step 1170.

When the first temperature-correlated value CV1 is lower than or equal to the average value CVavg of each temperature-correlated value CVn, the CPU makes a "No" determination in step 1140 and transitions to step 1155 to determine whether or not the first temperature-correlated value CV1 is lower than the average value CVavg of each temperature-correlated value CVn. When the first temperature-correlated value CV1 is lower than the average value CVavg of each temperature-correlated value CVn, the CPU makes a "Yes" determination in step 1155 and transitions to step 1160 to increase the intensity of the electromagnetic wave of the antenna A1 by a predetermined amount. Then, the CPU transitions to step 1170. When the first temperature-correlated value CV1 is not lower than the average value CVavg of each temperature-correlated value CVn, that is, when the first temperature-correlated value CV1 is not equal to the average value CVavg of each temperature-correlated value CVn, the CPU makes a "No" determination in step 1155 and transitions to step 1165. In such a case, the CPU maintains the intensity of the electromagnetic wave of the antenna A1 and transitions to step 1170.

When the CPU transitions to step 1170, the CPU executes the same control for the second temperature-correlated value CV2 as the control executed for the first temperature-correlated value CV1 in step 1115 to step 1165.

In step 1175 and step 1180, the CPU executes the same control for the third temperature-correlated value CV3 and the fourth temperature-correlated value CV4 as the control executed for the second temperature-correlated value CV2 in step 1170. Then, the CPU transitions to step 1195 to temporarily finish the present routine.

As described above, when the n-th temperature-correlated value is not a value that falls within the predetermined range, the first heating device is configured to control the operation of the electromagnetic wave generator to adjust the intensity of the electromagnetic wave radiated from the n-th antenna such that the n-th temperature-correlated value becomes a value that falls within the predetermined range.

Second Embodiment

A heating device for an exhaust catalyst according to a second embodiment of the present invention (hereinafter, referred to as "second heating device") will be described. The second heating device has a different method of acquiring the temperature-correlated value from the first heating device. Accordingly, hereinafter, the method of acquiring the temperature-correlated value using the second heating device will be described.

Method of Acquiring Temperature-Correlated Value Using Second Heating Device

Figure 12:
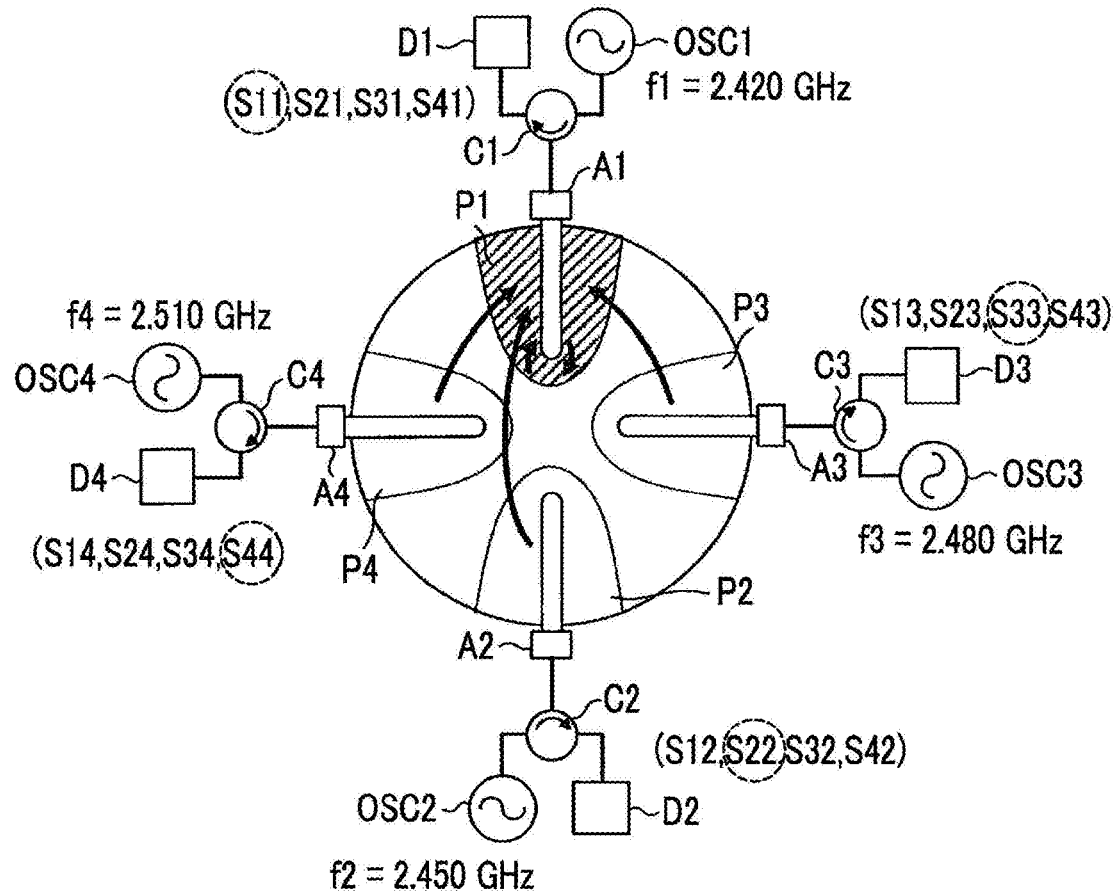
FIG. 12 is a diagram for describing the operation of a temperature-correlated value acquisition control of a second heating device.

Hereinafter, the method will be described with reference to FIG. 12. (1) Microwaves having different oscillation frequencies (oscillation frequencies f1, f2, f3, f4) and a predetermined intensity (same intensity) are radiated at the same time from each antenna An. For example, the oscillation frequencies f1 to f4 of the microwave generators OSC1 to OSC4 are set to 2.420 GHz, 2.450 GHz, 1480 GHz, and 1510 GHz (30 MHz interval) respectively. Hereinafter, the oscillation frequencies f1 to f4 will be referred to as the first frequency f1 to the fourth frequency f4 respectively. The frequencies are for illustrative purposes and are not intended to limit the present invention. (2) Reflective waves that are input into each antenna An are separated from each other by each of the microwave detectors D1 to D4 according to the frequency. The separation of the reflective waves according to the frequency uses a bandpass filter that corresponds to each frequency band. (3) The intensity of the microwave for each reflective wave separated according to the frequency is measured by each of the microwave detectors D1 to D4. (4) The temperature of the part of the catalyst 52 close to the antenna An corresponding to the intensity of each reflective wave at each frequency is estimated to be low.

The result of summarization of the intensity of the reflective wave is illustrated in Table 3. When the temperature of the first part P1 is low, and the "specific radiation control" for controlling the operation of the electromagnetic wave generator to radiate an electromagnetic wave having the first frequency f1 to the first part P1 from the antenna A1, radiate an electromagnetic wave having the second frequency f2 different from the first frequency f1 to the second part P2 from the antenna A2, radiate an electromagnetic wave having the third frequency f3 different from the first frequency f1 and the second frequency f2 to the third part P3 from the antenna A3, and radiate an electromagnetic wave having the fourth frequency f4 different from the first frequency f1, the second frequency f2, and the third frequency f3 to the fourth part P4 from the antenna A4 is executed, the value of the first electromagnetic wave intensity that is the total of the intensity of each reflective wave is high, and the values of the second electromagnetic wave intensity, the third electromagnetic wave intensity, and the fourth electromagnetic wave intensity are approximately moderate.

TABLE 3

| Specific Radiation Control | Oscillation Frequency | Reflective Wave Intensity |
| --- | --- | --- |
| Radiation from A1 | f1 | High (S11) |
| Radiation from A2 | f2 | Moderate (S22) |
| Radiation from A3 | f3 | Moderate (S33) |
| Radiation from A4 | f4 | Moderate (S44) |

When the temperature of the first part P1 is high, and the "specific radiation control" is executed, the value of the first electromagnetic wave intensity is low, and the values of the second electromagnetic wave intensity, the third electromagnetic wave intensity, and the fourth electromagnetic wave intensity are approximately moderate as illustrated in Table 4.

TABLE 4

| Specific Radiation Control | Oscillation Frequency | Reflective Wave Intensity |
| --- | --- | --- |
| Radiation from A1 | f1 | Low (S11) |
| Radiation from A2 | f2 | Moderate (S22) |
| Radiation from A3 | f3 | Moderate (S33) |
| Radiation from A4 | f4 | Moderate (S44) |

Figure 13:
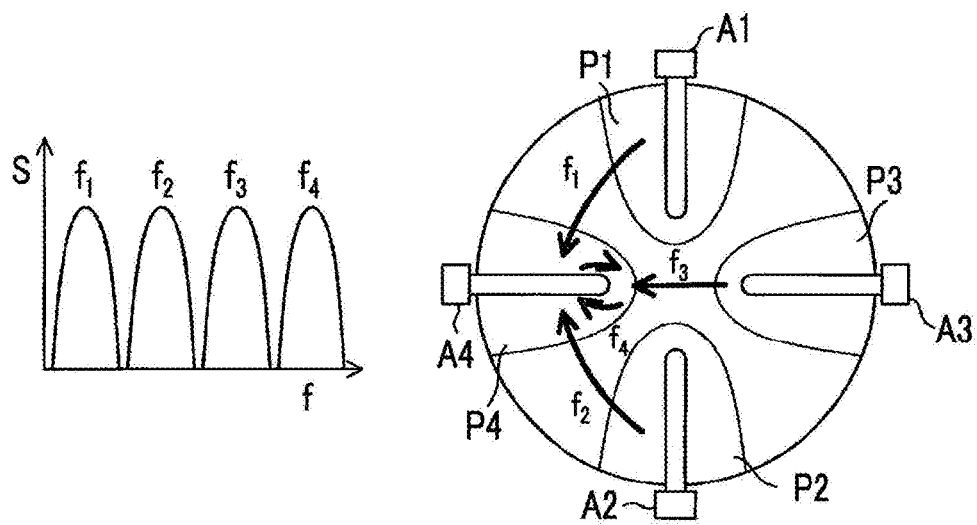
FIG. 13 is a diagram for schematically describing the temperature-correlated value acquisition control performed by the second heating device.

As illustrated in FIG. 13, for example, the microwave having the oscillation frequency f1 from the antenna A1, the microwave having the oscillation frequency f2 from the antenna A2, the microwave having the oscillation frequency f3 from the antenna A3, and the microwave having the oscillation frequency f4 from the antenna A4 are radiated to the antenna A4. Accordingly, microwaves from different antennas are incident on the antenna A4 at the same time.

However, according to the method, the second heating device can specify each antenna from which each microwave is radiated, by associating the oscillation frequencies of the radiated microwaves with the positions of the antennas.

Specific Operation

Figure 14:
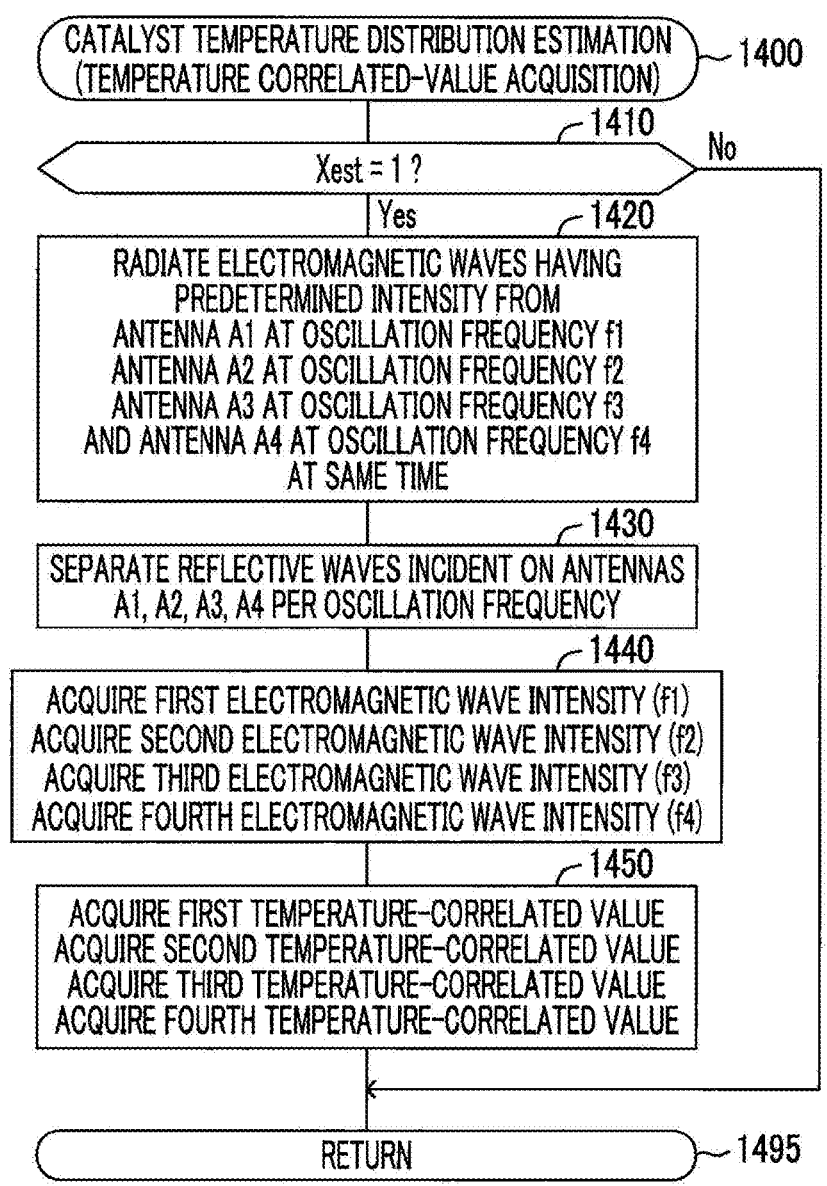
FIG. 14 is a flowchart illustrating a "catalyst temperature distribution estimation routine" that is executed by a CPU of an ECU of the second heating device.

The CPU of the ECU 100 executes a catalyst temperature distribution estimation routine illustrated by a flowchart in FIG. 14 for each elapse of a predetermined time period. Accordingly, when a predetermined timing is reached, the CPU starts processing from step 1400 in FIG. 14 and transitions to step 1410 to determine whether or not the value of the catalyst temperature distribution estimation execution flag Xest is equal to "1".

When the value of the catalyst temperature distribution estimation execution flag Xest is equal to "1", the CPU makes a "Yes" determination in step 1410 and processes step 1420 to step 1450 described below in order. Then, the CPU transitions to step 1495 to temporarily finish the present routine.

Step 1420: The CPU causes the antennas A1 (61a), A2 (61c), A3 (61b), A4 (61d) to radiate microwaves having a predetermined intensity (same intensity) at the different oscillation frequencies f1, f2, f3, f4 at the same time.

Step 1430: The CPU separates the reflective waves incident on the antennas A1 (61a), A2 (61c), A3 (61b), A4 (61d) per oscillation frequency by each of the microwave detectors D1 (64a). D2 (64c). D3 (64b), D4 (64d).

Step 1440: The CPU acquires the intensity of each reflective wave separated per oscillation frequency. The CPU acquires the intensities of the reflective waves at the oscillation frequencies f1, f2, f3, f4 as the first electromagnetic wave intensity, the second electromagnetic wave intensity, the third electromagnetic wave intensity, and the fourth electromagnetic wave intensity respectively.

Step 1450: Based on the first electromagnetic wave intensity, the CPU acquires the first temperature-correlated value that is a value correlated with the temperature of the first part P1. Similarly, based on the second electromagnetic wave intensity, the CPU acquires the second temperature-correlated value that is a value correlated with the temperature of the second part P2. Based on the third electromagnetic wave intensity, the CPU acquires the third temperature-correlated value that is a value correlated with the temperature of the third part P3. Based on the fourth electromagnetic wave intensity, the CPU acquires the fourth temperature-correlated value that is a value correlated with the temperature of the fourth part P4.

When the value of the catalyst temperature distribution estimation execution flag Xest is equal to "0", and the CPU makes a "No" determination in step 1410, the CPU directly transitions to step 1495 to temporarily finish the present routine.

As described above, in the temperature-correlated value acquisition control; the CPU controls, as the specific radiation control, the operation of the microwave generators OSC1 to OSC4 to set a radiation state where the electromagnetic wave from the first antenna A1 oscillates at the first frequency f1, a radiation state where the electromagnetic wave from the second antenna A2 oscillates at the second frequency f2 different from the first frequency f1, a radiation state where the electromagnetic wave from the third antenna A3 oscillates at the third frequency f3 different from the first frequency f1 and the second frequency f2, and a radiation state where the electromagnetic wave from the fourth antenna A4 oscillates at the fourth frequency f4 different from the first frequency the second frequency f2, and the third frequency f3.

As described heretofore, the second heating device can acquire the intensity of the electromagnetic wave radiated by each antenna without being affected by the electromagnetic wave radiated from the other antennas. Thus, the second heating device can accurately acquire the temperature of a specific part (temperature-correlated value) of the catalyst 52 and estimate the temperature distribution of the catalyst 52, Modification Example The present invention is not limited to the embodiments and can employ various modification examples as described below within the scope of the present invention.

Modification Example of Correcting Variation in Catalyst Temperature

While, in the embodiments, each temperature-correlated value is corrected by changing the intensity of the microwave radiated from each antenna when variation in catalyst temperature is corrected, each temperature-correlated value may be corrected by changing the oscillation frequency of the microwave. When the microwave is being radiated as pulses at constant cycles, the heating device may correct each temperature-correlated value by changing the duty cycle of the pulse width instead of changing the intensity of the microwave. When the phase of the microwave radiated from each antenna is changed, the microwave radiated from each antenna interferes with each other, and the temperature-correlated value in each of the parts P1 to P4 of the exhaust catalyst 52 may be changed. Accordingly, the heating device may correct each temperature-correlated value by changing the phase of the microwave radiated from each antenna. Hereinafter, operation of correcting each temperature-correlated value by changing the oscillation frequency of the microwave will be specifically described.

Specific Operation

Figure 15:
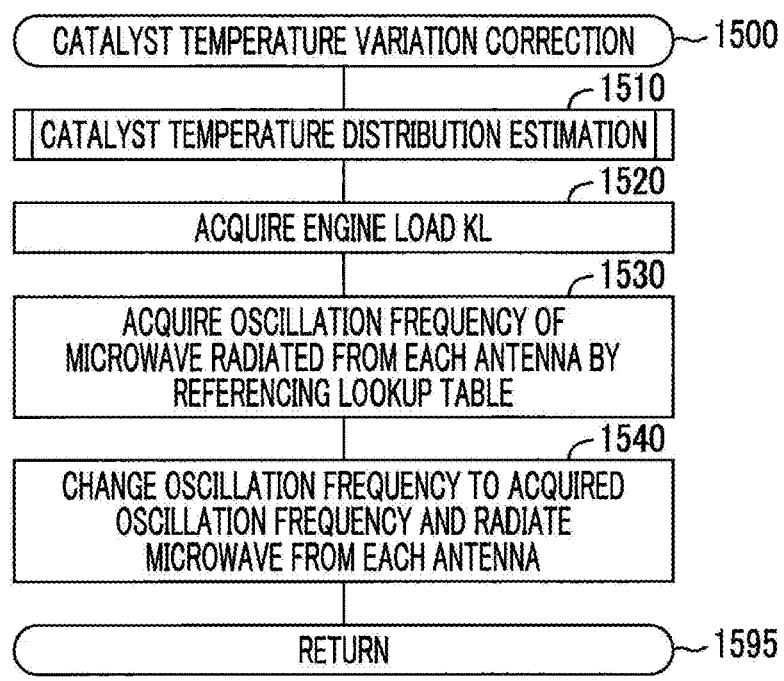
FIG. 15 is a flowchart illustrating a modification example of the "catalyst temperature variation correction routine" that is executed by the CPU of the ECU illustrated in FIG. 1.

The CPU of the ECU 100 executes a catalyst temperature variation correction routine illustrated by a flowchart in FIG. 15 for each elapse of a predetermined time period. Accordingly, when a predetermined timing is reached, the CPU starts processing from step 1500 in FIG. 15 and transitions to step 1510 to execute the catalyst temperature distribution estimation (temperature-correlated value acquisition) routine. That is, the CPU transitions to step 900 to execute the catalyst temperature distribution estimation routine, and acquires each temperature-correlated value CVn. When the catalyst temperature distribution estimation routine is temporarily finished, the CPU transitions to step 1520.

When the CPU transitions to step 1520, the CPU acquires an engine load KL based on the opening degree of the throttle valve acquired by a throttle valve opening degree sensor not illustrated.

Figure 16:
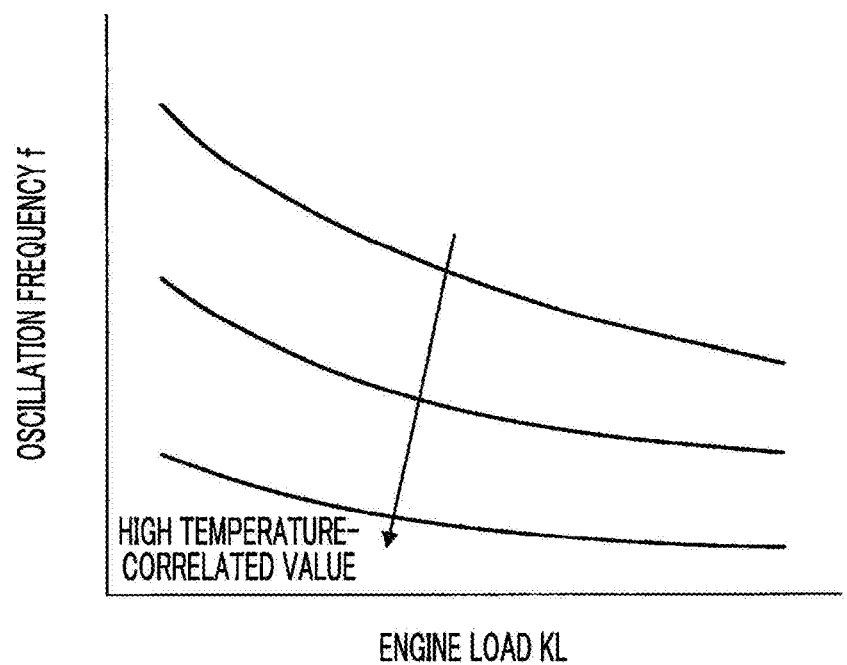
FIG. 16 is a lookup table that defines a relationship among a catalyst temperature, an electromagnetic wave intensity, and an engine load referenced by the CPU of the ECU illustrated in FIG. 1.

The CPU transitions to step 1530 and acquires the oscillation frequency of the microwave radiated from each antenna by applying the acquired engine load KL and the acquired temperature-correlated value CV to a lookup table (refer to FIG. 16) that is stored in the ROM and defines a relationship among "the engine load KL, the temperature-correlated value CV, and the oscillation frequency f of the microwave".

The CPU transitions to step 1540 and performs radiation by changing the oscillation frequency f of the microwave radiated from each antenna to the oscillation frequency acquired in step 1530. Then, the CPU transitions to step 1595 to temporarily finish the present routine.

Each temperature-correlated value may be corrected by changing the output duty cycle of the microwave. In such a case, an output duty cycle DR of the microwave is acquired by applying the acquired engine load KL and the acquired temperature-correlated value CV to a lookup table that is stored in the ROM and defines a relationship among "the engine load KL, the temperature-correlated value CV, and the output duty cycle DR of the microwave".

Each temperature-correlated value may be corrected by changing a phase Ph of the microwave. In such a case, the phase Ph of the microwave is acquired by applying the acquired engine load KL and the acquired temperature-correlated value CV to a lookup table that is stored in the ROM and defines a relationship among "the engine load KL, the temperature-correlated value CV, and the phase Ph of the microwave".

An intensity S of the microwave may also be acquired by applying the acquired engine load KL and the acquired temperature-correlated value CV to a preset lookup table that is stored in the ROM and defines a relationship among "the engine load KL, the temperature-correlated value CV, and the intensity S of the microwave".

The relationship defined in the lookup table may have the catalyst temperature instead of the temperature-correlated value CV. In such a case, a step of acquiring the catalyst temperature from the temperature-correlated value CV may be added to the flowchart illustrated in FIG. 15.

As described above, when the n-th temperature-correlated value is not a value that falls within the predetermined range, the heating device for an exhaust catalyst according to an aspect of the present invention is configured to control the operation of the electromagnetic wave generator to adjust at least one of the intensity and the output duty cycle of the electromagnetic wave radiated from the n-th antenna such that the n-th temperature-correlated value becomes a value that falls within the predetermined range.

While the heating device 60 includes four antennas (A1 to A4) in the embodiments, the heating device 60 may include at least the first antenna A1 that is disposed close to the first part PI of the catalyst 52 and radiates the electromagnetic wave generated by the microwave generator OSC1 to the first part P1, and the second antenna A2 that is disposed close to the second part P2 different from the first part P1 and radiates the electromagnetic wave generated by the microwave generator OSC2 to the second part P2. That is, the heating device 60 may include at least two antennas.

In the embodiments, when the temperature-correlated value acquisition control that is performed with different radiation timings for radiating the microwave from each antenna is executed, the CPU performs the first radiation control to the fourth radiation control in the order of the first antenna A1, the second antenna A2, the third antenna A3, and the fourth antenna A4. However, the radiation order for the first radiation control to the fourth radiation control is not particularly limited. While the time period of executing each of the first radiation control to the fourth radiation control is the same, the length of the time period does not need to be the same and may be appropriately adjusted within a range where the time period in which the microwave detector 64 can perform detection can be secured.

In the embodiments, when the temperature-correlated value acquisition control that is performed with different oscillation frequencies for the microwave radiated from each antenna is executed, the magnitude relationship between the oscillation frequencies of the microwave radiated from each antenna is set to be a relationship of first frequency f1<second frequency f2<third frequency f3<fourth frequency f4. However, the magnitude relationship is not particularly limited. While the intervals between each oscillation frequency are equal to each other, the intervals do not need to be equal to each other and may be appropriately adjusted within a range where the oscillation frequencies can be separated by the bandpass filter.

In the embodiments, the microwave transmitted to the antenna 61 from the microwave generator 63 and the microwave transmitted to the microwave detector 64 from the antenna 61 are separated from each other by the circulator 65. Instead of such a configuration, a radiation antenna that is connected to merely the microwave generator 63, and an incidence antenna that is adjacent to the radiation antenna and is connected to merely the microwave detector 64 may be included. In such a case, a microwave absorbing member may be disposed in order to suppress direct incidence of the microwave from the adjacent radiation antenna on the incidence antenna.

While the embodiments describe the heating device that is applied to the exhaust catalyst (three-way catalyst) used in a gasoline engine, the exhaust catalyst may be applied to a diesel engine catalyst, a DPF (diesel particulate filter), and the like.

The invention claimed is:

1. A heating device for an exhaust catalyst disposed in an exhaust passage of an internal combustion engine, the exhaust catalyst being configured to generate heat by absorbing an electromagnetic wave, the heating device comprising:

at least one electromagnetic wave generator configured to generate an electromagnetic wave;

a first antenna disposed close to a first part of the exhaust catalyst, the first antenna being configured to radiate the electromagnetic wave generated by the electromagnetic wave generator to the first part;

a second antenna disposed close to a second part of the exhaust catalyst different from the first part, the second antenna being disposed at a predetermined interval from the first antenna, the second antenna being configured to radiate the electromagnetic wave generated by the electromagnetic wave generator to the second part; and an electronic control device configured to execute a catalyst temperature increasing control for increasing a temperature of the exhaust catalyst by controlling the electromagnetic wave generator to radiate the electromagnetic wave to the first part and the second part from the first antenna and the second antenna respectively, execute a specific radiation control for controlling operation of the electromagnetic wave generator to set a radiation state of the electromagnetic wave from the first antenna to be a different state from a radiation state of the electromagnetic wave from the second antenna, acquire an intensity of an electromagnetic wave, of electromagnetic waves incident on the first antenna at the execution of the specific radiation control, which corresponds to the radiation state of the electromagnetic wave radiated from the first antenna as a first electromagnetic wave intensity, acquire an intensity of an electromagnetic wave, of electromagnetic waves incident on the second antenna at the execution of the specific radiation control, which corresponds to the radiation state of the electromagnetic wave radiated from the second antenna as a second electromagnetic wave intensity, acquire, based on the first electromagnetic wave intensity, a first temperature-correlated value that is a value correlated with a temperature of the first part, acquire, based on the second electromagnetic wave intensity, a second temperature-correlated value that is a value correlated with a temperature of the second part, and when the first temperature-correlated value and the second temperature-correlated value are different from each other, control the operation of the electromagnetic wave generator to adjust at least one of the intensity and an output duty cycle of the electromagnetic wave radiated from at least one of the first antenna and the second antenna such that a deviation between the first temperature-correlated value and the second temperature-correlated value is decreased in the catalyst temperature increasing control.

2. The heating device according to claim 1, wherein:

the electronic control device is configured to execute, as the specific radiation control, a first radiation control for controlling the operation of the electromagnetic wave generator to set the radiation state to be a state where the electromagnetic wave is radiated to the first part from the first antenna, and where the electromagnetic wave is not radiated to the second part from the second antenna, and a second radiation control for controlling the operation of the electromagnetic wave generator to set the radiation state to be a state where the electromagnetic wave is not radiated to the first part from the first antenna, and where the electromagnetic wave is radiated to the second part from the second antenna;

the electronic control device is configured to acquire, as the first electromagnetic wave intensity, the intensity of the electromagnetic waves incident on the first antenna at the execution of the first radiation control; and the electronic control device is configured to acquire, as the second electromagnetic wave intensity, the intensity of the electromagnetic waves incident on the second antenna at the execution of the second radiation control.

3. The heating device according to claim 1, wherein:

as the specific radiation control, the electronic control device is configured to control the operation of the electromagnetic wave generator to radiate an electromagnetic wave having a first frequency from the first antenna and radiate an electromagnetic wave having a second frequency different from the first frequency from the second antenna; and the electronic control device is configured to acquire, as the first electromagnetic wave intensity, the intensity of the electromagnetic wave having the first frequency among the electromagnetic waves incident on the first antenna at the execution of the specific radiation control, and acquire, as the second electromagnetic wave intensity, the intensity of the electromagnetic wave having the second frequency among the electromagnetic waves incident on the second antenna at the execution of the specific radiation control.

4. The heating device according to claim 1, wherein:

when the first temperature-correlated value is not a value that falls within a predetermined range, the electronic control device is configured to control the operation of the electromagnetic wave generator to adjust at least one of the intensity and an output duty cycle of the electromagnetic wave radiated from the first antenna such that the first temperature-correlated value becomes a value that falls within the predetermined range; and when the second temperature-correlated value is not a value that falls within the predetermined range, the electronic control device is configured to control the operation of the electromagnetic wave generator to adjust at least one of the intensity and an output duty cycle of the electromagnetic wave radiated from the second antenna such that the second temperature-correlated value becomes a value that falls within the predetermined range.

* * * * *